US011180022B2

(12) United States Patent
Peterson et al.

(10) Patent No.: US 11,180,022 B2
(45) Date of Patent: Nov. 23, 2021

(54) VEHICLE TRANSMISSION AND DRIVE SYSTEM

(71) Applicant: Eaton Cummins Automated Transmission Technologies, LLC, Galesburg, MI (US)

(72) Inventors: Paul Peterson, Scotts, MI (US); Graeme Andrew Jackson, Kalamazoo, MI (US); Paul Wilson, Otsego, MI (US)

(73) Assignee: Eaton Cummins Automated Transmission Technologies, LLC, Galesburg, MI (US)

( * ) Notice: Subject to any disclaimer, the term of this patent is extended or adjusted under 35 U.S.C. 154(b) by 0 days.

(21) Appl. No.: 16/951,510

(22) Filed: Nov. 18, 2020

(65) Prior Publication Data

US 2021/0162860 A1   Jun. 3, 2021

Related U.S. Application Data

(60) Provisional application No. 62/942,721, filed on Dec. 2, 2019.

(51) Int. Cl.
*F16H 37/06* (2006.01)
*B60K 17/08* (2006.01)
(Continued)

(52) U.S. Cl.
CPC .............. *B60K 17/08* (2013.01); *F16C 19/10* (2013.01); *F16D 11/14* (2013.01); *F16H 37/065* (2013.01); *B60K 17/28* (2013.01);

*F16C 2361/43* (2013.01); *F16H 57/02* (2013.01); *F16H 2057/02043* (2013.01); *F16H 2200/0078* (2013.01); *F16H 2702/02* (2013.01)

(58) Field of Classification Search
CPC ......... F16H 2702/02; F16H 2200/0078; F16H 2702/06; F16C 19/10
See application file for complete search history.

(56) References Cited

U.S. PATENT DOCUMENTS 7,437,964 B2 * 10/2008 Gitt ........................ F16H 3/006
74/330
2012/0061198 A1 * 3/2012 Asatsuke ................ F16D 25/10
192/3.25

(Continued)

*Primary Examiner* — Stacey A Fluhart
(74) *Attorney, Agent, or Firm* — Harness, Dickey & Pierce, P.L.C.

(57) ABSTRACT

A transmission includes a transmission main housing, an intermediate plate secured to the transmission main housing; and a rear housing attached to the intermediate plate and/or attached with fasteners through the intermediate plate to the main housing. An input shaft is connected to an extension shaft including a plurality of splitter gears selectively couple-able to the extension shaft. A main shaft is rotatably supported by the range shaft and range shaft bearing and includes a plurality of main box gears selectively couple-able to the main shaft. A range shaft is drivingly connected to the main shaft and provides input to a planetary gear assembly. The extension shaft is supported at a first end by a bearing assembly within a partition wall of the main transmission housing and a second end is supported by a bearing assembly disposed within the bore in the range shaft.

21 Claims, 17 Drawing Sheets

(51) Int. Cl.
    *F16D 11/14*     (2006.01)
    *F16C 19/10*     (2006.01)
    *B60K 17/28*     (2006.01)
    *F16H 57/02*     (2012.01)

(56) References Cited

U.S. PATENT DOCUMENTS

2015/0128736 A1\*   5/2015   Hedman  ................ F16H 3/091
                                                                       74/330
2018/0238427 A1\*   8/2018   Mittelberger  ........... F16H 3/095

\* cited by examiner

VEHICLE TRANSMISSION AND DRIVE SYSTEM

CROSS-REFERENCE TO RELATED APPLICATIONS

This application claims the benefit of U.S. Provisional Application No. 62/942,721, filed on Dec. 2, 2019. The entire disclosure of the above application is incorporated herein by reference.

FIELD

The present disclosure relates to a vehicle transmission for a commercial vehicle.

BACKGROUND

This section provides background information related to the present disclosure which is not necessarily prior art.

Transmissions serve a critical function in translating power provided by a prime mover to a final load. The transmission serves to provide speed ratio changing between the prime mover output (e.g. a rotating shaft) and a load driving input (e.g. a rotating shaft coupled to wheels, a pump, or other device responsive to the driving shaft). The ability to provide selectable speed ratios allows the transmission to amplify torque, keep the prime mover and load speeds within ranges desired for those devices, and to selectively disconnect the prime mover from the load at certain operating conditions.

Transmissions are subjected to a number of conflicting constraints and operating requirements. For example, the transmission must be able to provide the desired range of torque multiplication while still handling the input torque requirements of the system. Additionally, from the view of the overall system, the transmission represents an overhead device—the space occupied by the transmission, the weight, and interface requirements of the transmission are all overhead aspects to the designer of the system. Transmission systems are highly complex, and they take a long time to design, integrate, and test; accordingly, the transmission is also often required to meet the expectations of the system integrator relative to previous or historical transmissions. For example, a reduction of the space occupied by a transmission may be desirable in the long run, but for a given system design it may be more desirable that an occupied space be identical to a previous generation transmission, or as close as possible.

Previously known transmission systems suffer from one or more drawbacks within a system as described following. To manage noise, robustness, and structural integrity concerns, previously known high output transmission systems use steel for the housing of the transmission. Additionally, thrust loads through the transmission, noise generated by gears, and installation issues such as complex gear timing issues, require a robust, and potentially overdesigned system in the housing, bearings, and/or installation procedures. Accordingly, there remains a need for improvements in the design of high output transmissions, particularly truck transmissions.

Forefront split transmissions, the length of the input shaft within the transmission gearbox becomes longer with additional splitter gears creating a longer over-hung input shaft inside the gearbox. This overhung length becomes excessive with more splitter ratios such as 3×3×2 and 4×2×2 architectures. With the front of the input shaft located by a potentially misaligned engine flywheel pilot bearing, the increased length of the internally over-hung shaft increases its radial displacement with respect to the gearbox centerline. Without significant improvement in manufacturing tolerances for both the engine and transmission, it is not possible to achieve the required input shaft alignment with the gearbox centerline with longer input shafts. Excessive splitter drive gear radial displacement with respect to the gearbox centerline reduces design robustness. In addition, for twin countershaft transmissions, the long overhung input shaft radial displacement prevents these gears from operating with balanced power transmission to/from each countershaft.

This over-hung radial displacement also preferences only the frontmost splitter drive gear to be utilized for PTO operation where unbalanced radial your loads and associated deflections are encountered and must be facilitated. Other more rearward splitter gear sets are not preferred for PTO operation due to design difficulty in contending with the PTO unbalanced loads and resulting deflections/misalignments. PTO applications are typically limited to the vehicle stationary mode operation only, with limited ratio choices available for vehicle mobile operation. There is typically no ability to shift between ratios when the PTO is engaged in vehicle mobile modes. If design solutions were achieved for PTO mode in all splitter ratios, than countershaft PTO speed relative to engine speed would vary depending on which of the 3 splitter ratios (3×3×2) or 4 splitter ratios (4×2×2) were utilized. These various countershaft PTO speeds would likely be an undesired complexity for the vehicle operator.

Another challenge for 3×3×2 or 4×2×2 front split transmissions is maintaining effective lubricant flow for the various ratios. For countershaft driven lube pumps, flow capacity would be established for the demands encountered with the slowest splitter drive ratio, while excessive flow is then encountered when operating in the faster splitter drive ratios. Optimum lube system mechanical efficiency is therefore not achieved in all ratios.

In transmissions constructed with twin countershafts, all gears on the countershaft are specified to be aligned, within available manufacturing tolerance capabilities, so that both countershafts have alike gear orientations. These 2 countershafts orient their meeting Center shaft gears approximately on the gearbox centerline, with variation (radial float) from true centerline dependent upon the countershaft gear alignment tolerance. Gearbox configuration that accommodates this radial float is essential in twin countershaft transmission designs. In transmissions constructed with helical gears, your thrust loads must be contended with for both drive torque and coasting (engine braking) torque directions. Bearings between gears/shafts in the center shaft locations must be robust to these speeds and thrust loads but must also be implemented with means to also contend with the center gear/shaft radial float caused by countershafts alignment tolerances on their meeting gears.

The traditional architecture approach for a 3×3×3 18 speed transmission with twin countershafts presents the design challenge of how shall the input shaft and 3 Front Splitter drive gears be configured, when gears must be spaced apart for the synchronizer's sliding clutches, and independently coupled to an input shaft, so as not to have excessive gearbox center axis radial displacement resulting from the input shaft aligned via the engine flywheel front pilot bearing location. An additional concern is how shall the auxiliary power takeoff's be configured such that there is consistent speed ratio with respect to the engine RPM versus encountering 3 different speed ratios with respect to the engine dictated by the drive splitter gear ratios at the countershafts. Likewise how can the lube pump be configured to provide consistent speed ratio with the engine regardless of the selected splitter gear ratio. An additional concern is how shall the PTO mode be configured such that it is feasible to operate when the vehicle is in mobile operation for any gear ratio. How shall the unbalanced radial load from the PTO mode drive gear be accommodated by the input design configuration. How shall the front splitter drive gears and input shaft be configured, when radial displacement is required in the unloaded splitter drive gear when the opposite drive gear is in the load path, yet must be constrained to the center of the shaft when driving PTO mode. How shall helical gearing thrust loads and differential speed conditions be accommodated the architecture. How shall PTO drive be configured, such that the center distance between the PTO axis and output shaft axis be made large enough to accommodate output end-yoke or output flange radial clearance with the PTO output yoke or PTO direct mount pump.

SUMMARY

This section provides a general summary of the disclosure, and is not a comprehensive disclosure of its full scope or all of its features.

In view of the above identified design concerns, the present disclosure utilizes a short input shaft that is aligned with the engine flywheel pilot bearing and is concentrically splined to an extension shaft that is coaxial to the gearbox. The 3 Front Splitter Dr. gears are couple able to the extension shaft via sliding clutches. The extension shaft may be constructed from one or more joined pieces as best suits the manufacturing approach. The thrust roller bearing races are maintained on the extension shaft center axis to minimize radial displacement while the 3 Splitter Dr. gears and main shaft gears are permitted to radially float for twin countershaft design.

Design of the present disclosure directly affixed an independent PTO drive gear to the extension shaft and utilize an independent driven gear/shaft for PTO output means. The PTO output can be in at least 2 forms, bottom mount gear meshing interface form or, rear mount shaft coupled interface form. This configuration affords a single speed ratio of the PTO with respect to the engine RPM. Also, the present disclosure configures the PTO rear shaft to drive the transmission lube pump for a single speed ratio with respect to the engine. This transmission lube pump is then active in all transmission states when the main input clutch is engaged with the engine. The present disclosure directly affixes an independent PTO drive gear to the extension shaft and utilizes an independent driven gear/shaft for PTO output means. This configuration provides for PTO mode to be available in all transmission ratios. Present disclosure further directly affixes an independent PTO drive gear to the extension shaft. Each end of the extension shaft shall be configured to be supported by bearings and/or other concentric shafts to absorb the radial PTO mode loading. The radial PTO mode loads onto the extension shaft have insignificant interaction with gear ratio loads when in PTO mobile mode. PTO driven gear shall be affixed to a shaft mounted on bearings which in turn is directly or indirectly affixed to the gearbox housing.

The present disclosure incorporates extension shaft significant radial clearance with the front splitter drive gears to accommodate radial float. The radial float is required for the unloaded splitter drive gear when the opposite splitter drive gear is in the operating load path. PTO radial loads observed by the affixed extension shaft are independent of splitter gear selection.

Present disclosure incorporates two thrust bearings, one between the $2^{nd}$ and $3^{rd}$ splitter drive gears and a $2^{nd}$ between the $3^{rd}$ splitter drive gear and the main shaft to address helical gearing thrust loads and differential speed conditions for normal engine drive torque mode. Disclosure incorporates an extension shaft ball bearing and main shaft ball bearing to accommodate thrust for engine braking torque mode. Thrust for engine braking mode may also be accommodated by a splitter section thrust bearing, but is dependent upon the operating ratio. Disclosure incorporates significant radial float in the interface of the $3^{rd}$ splitter drive/driven gear with respect to its mating thrust bearing race.

Disclosure also incorporates an expanded center distance for the PTO driven gear/shaft output to accommodate output end-yoke or output flange radial clearance with the rear mount PTO output yoke or direct mount pump. This PTO expanded center distance is independent of the countershaft center distance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
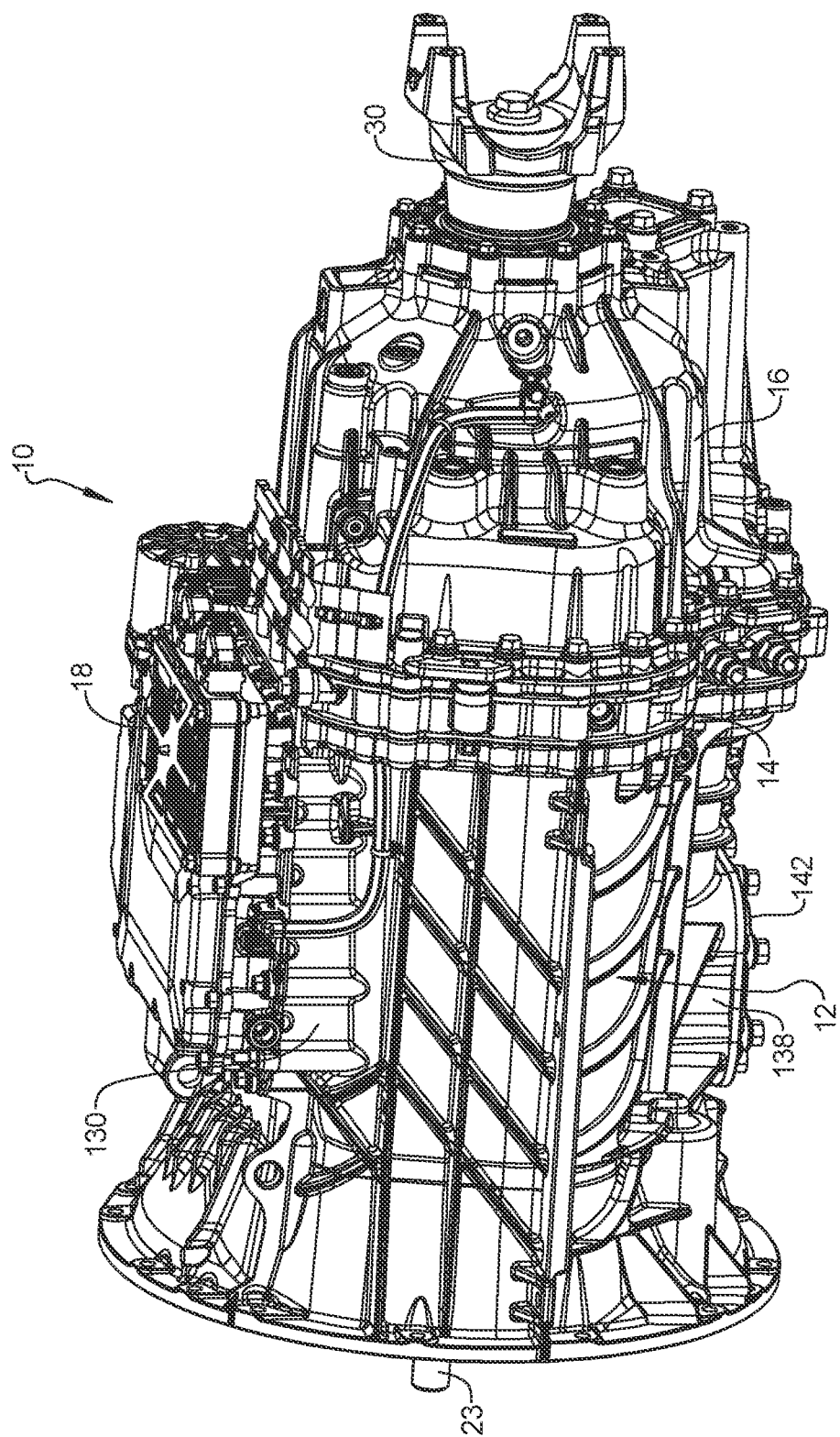
FIG. 1 is a perspective view of a transmission.

With reference to FIG. 1, a perspective view of a transmission 10 is shown including a main housing 12, an intermediate plate 14 and a rear housing 16. The transmission 10 is assembled with the intermediate plate 14 assembled to a rear end of the main housing 12 and the rear housing 16 is mounted to the intermediate plate 14. An integrated actuator housing 18 is mounted to the main housing 12.

Figure 2A:
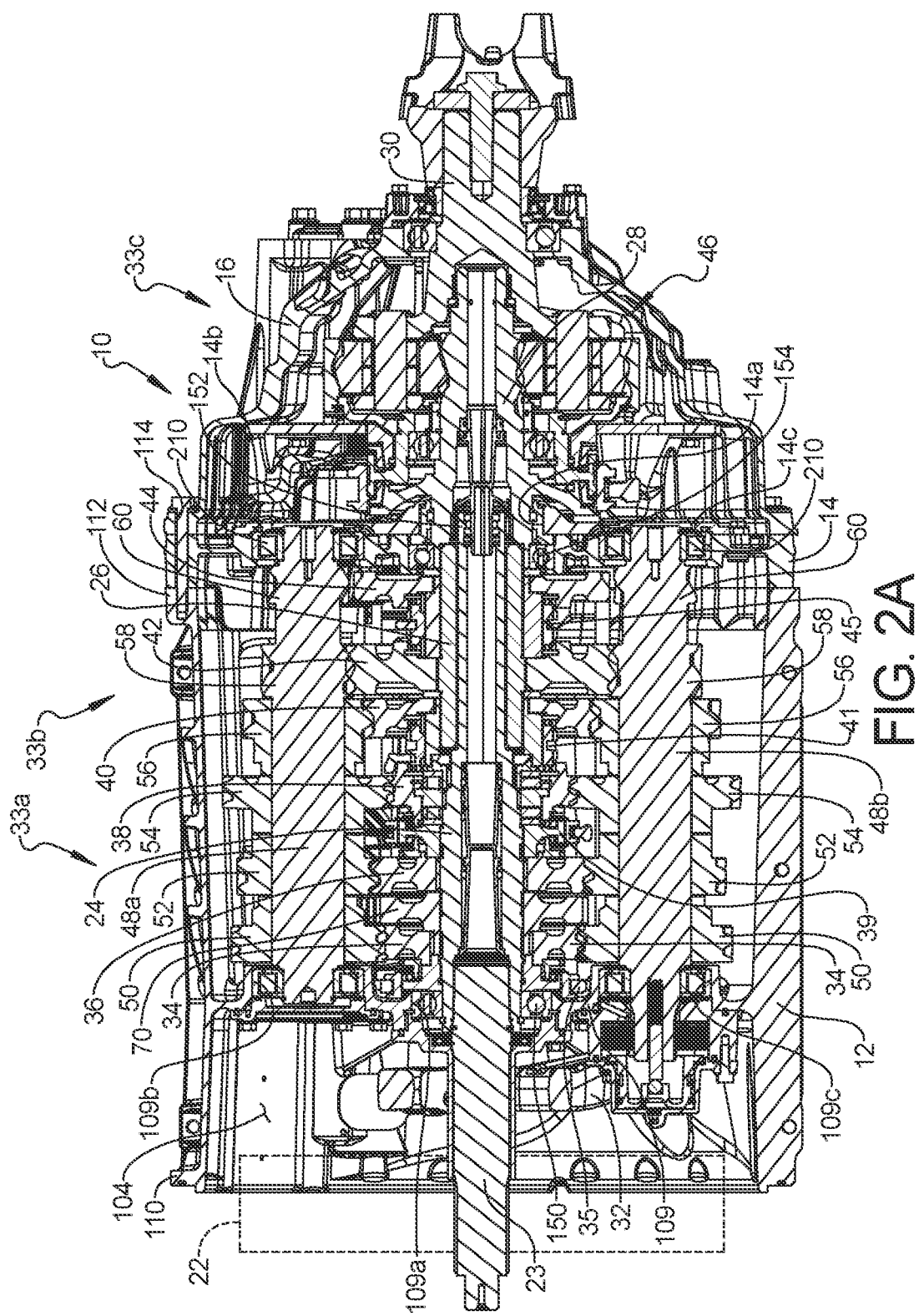
FIG. 2A is a horizontal cross-sectional view of the transmission assembly according to the principles of the present disclosure.

As shown in FIG. 2A, the transmission 10 is depicted schematically in a horizontal cutaway view. The example transmission 10 is capable of providing power throughput from a prime mover (not shown) interfacing with a clutch unit 22 (schematically shown) to an input shaft 23, from the input shaft 23 to an extension shaft 24, from the extension shaft 24 to a main shaft portion 26, from the main shaft portion to a range shaft portion 28, and from the range shaft portion 28 to an output shaft assembly 30.

The example transmission 10 is operable to adjust torque multiplication ratios throughout the transmission, to engage and disengage the clutch unit 22 from the prime mover (not shown), and/or to position the transmission 10 into a neutral position wherein, even if the clutch unit 22 is engaged to the prime mover, torque is not transmitted from the clutch unit 22 to the output shaft assembly 30.

Figure 2B:
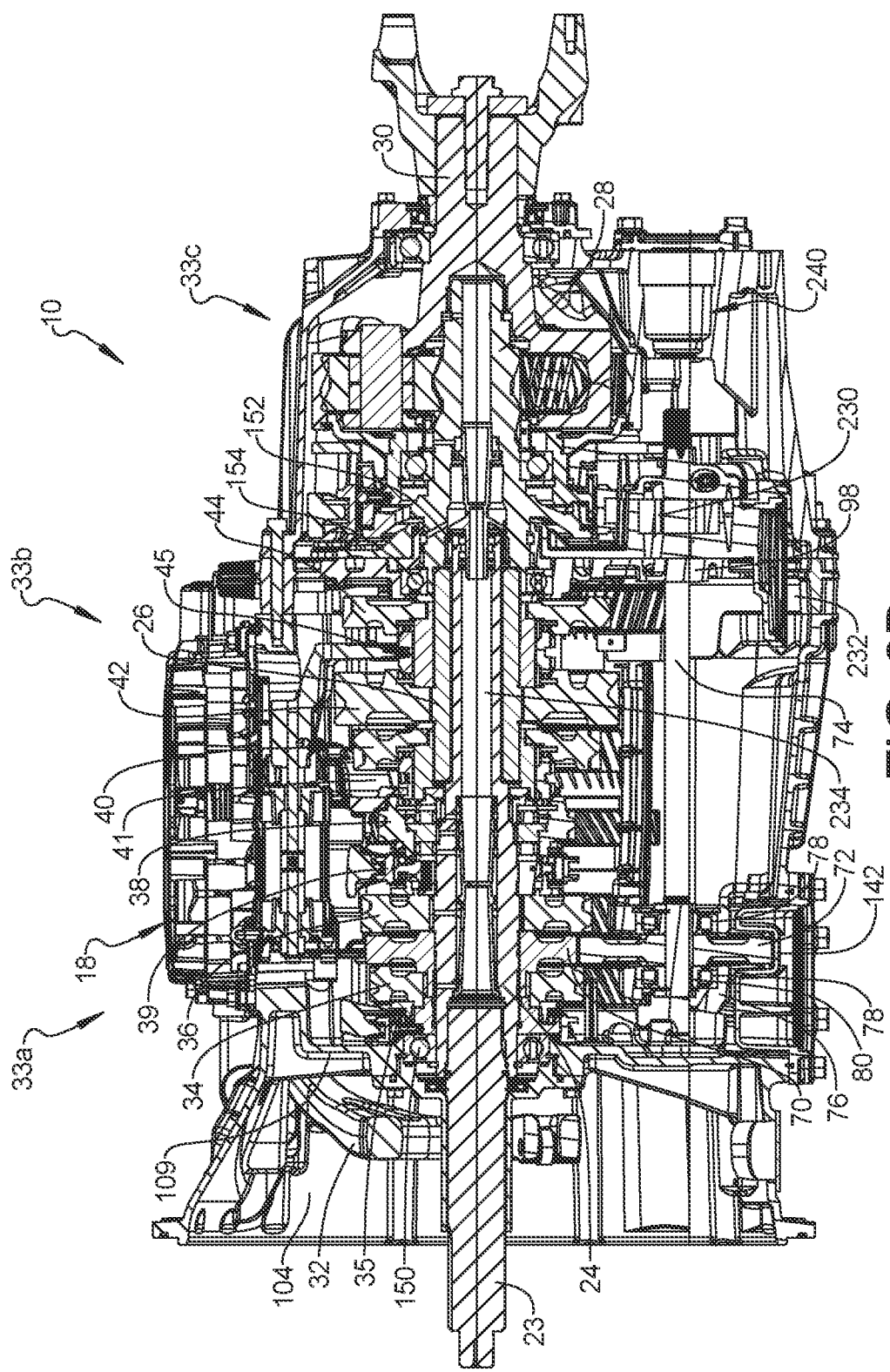
FIG. 2B is a vertical cross-sectional view of the transmission assembly according to the principles of the present disclosure.

With further reference to FIGS. 2A and 2B, a clutch engagement yoke 32 is provided for engagement of the clutch unit 22 with the prime mover. The example clutch engagement yoke 32 is operationally coupled at a first end to a clutch actuator. In certain embodiments of the present disclosure, any type of clutch actuation may be utilized, including a concentric clutch actuator (not shown) and/or another type of linear clutch actuation device.

The example transmission 20 includes a splitter section 33a, a main box section 33b and a range gear section 33c to provide multiple gear ratios. The splitter section 33a includes a first splitter gear 34, a second splitter gear 36 and a third splitter gear 38 each selectively coupled to the extension shaft 24. The inclusion of the splitter gears 34, 36, 38 allow for additional distinct gear ratios provided by the extension shaft 24. The splitter gear 34 can be rotatably engaged with the extension shaft 24 by a first synchronizer clutch 35, while the splitter gears 36 and 38 can be selectively rotatably engaged with the extension shaft 24 by a second two-sided synchronizer clutch 39.

The main box section 33b of the example transmission 20 further includes a number of main box gears 40, 42, 44 selectively coupled to the main shaft portion 26. The main box gear 40 can be rotatably engaged with the main shaft 26 by a third synchronizer clutch 41, while the main box gears 42 and 44 can be selectively rotatably engaged with the main shaft 26 by a fourth two-sided synchronizer clutch 45.

The range gear section 33c of the example transmission 20 further includes a planetary gear assembly 46 that couples the range shaft portion 28 to the output shaft assembly 30 through at least two selectable gear ratios between the range shaft portion 28 and the output shaft assembly 30. In particular, as is known in the art, the planetary carrier of the planetary gear assembly 46 can be engaged to the sun gear to provide a drive ratio of 1:1 or disengaged to provide a gear reduction through the planetary system.

The example transmission 20 further includes at least one, and preferably two countershafts 48a, 48b, the countershafts 48a, 48b having three aligning gears 50, 52, 54 within the splitter section 33a and drivingly engaged with the respective first, second and third splitter gears 34, 36, 38 on the extension shaft 24. The countershafts 48a, 48b further include three aligning gears 56, 58, 60 within the main box section 33b and drivingly engaged with the respective first, second and third main box gears 40, 42, 44 selectively coupled to the main shaft portion 26. With the three gears in the splitter section 33a, the three gears in the main box section 33b and the two gear ratios provided by the range gear section 33c, the transmission 20 provides a 3×3×2 transmission architecture that is operable to provide 18 practical and functional gear ratios. The number and selection of gears depends upon the desired number of gear ratios from the transmission.

The transmission 10 includes a pair of reverse idler gears 62 (best shown in FIG. 9) that engage with the aligning gears 60 of the countershafts 48a, 48b and with the main box gear 44 of the main shaft portion 26. The countershaft(s) 48a, 48b thereby selectively transmit forward or reverse power between the extension shaft 24 and the main shaft portion 26, depending upon which gears are rotationally fixed (via clutches) to the extension shaft 24 and/or the main shaft portion 26.

As shown in the vertical cross-sectional view of the transmission 10 in FIG. 2B, the transmission further includes a PTO drive gear 70 fixed to the extension shaft 24 for rotation therewith. The PTO drive gear 70 is disposed between the first splitter gear 34 and the second splitter gear 36 and is engaged with a PTO driven gear 72 that is mounted to a PTO shaft 74.

Figure 9:
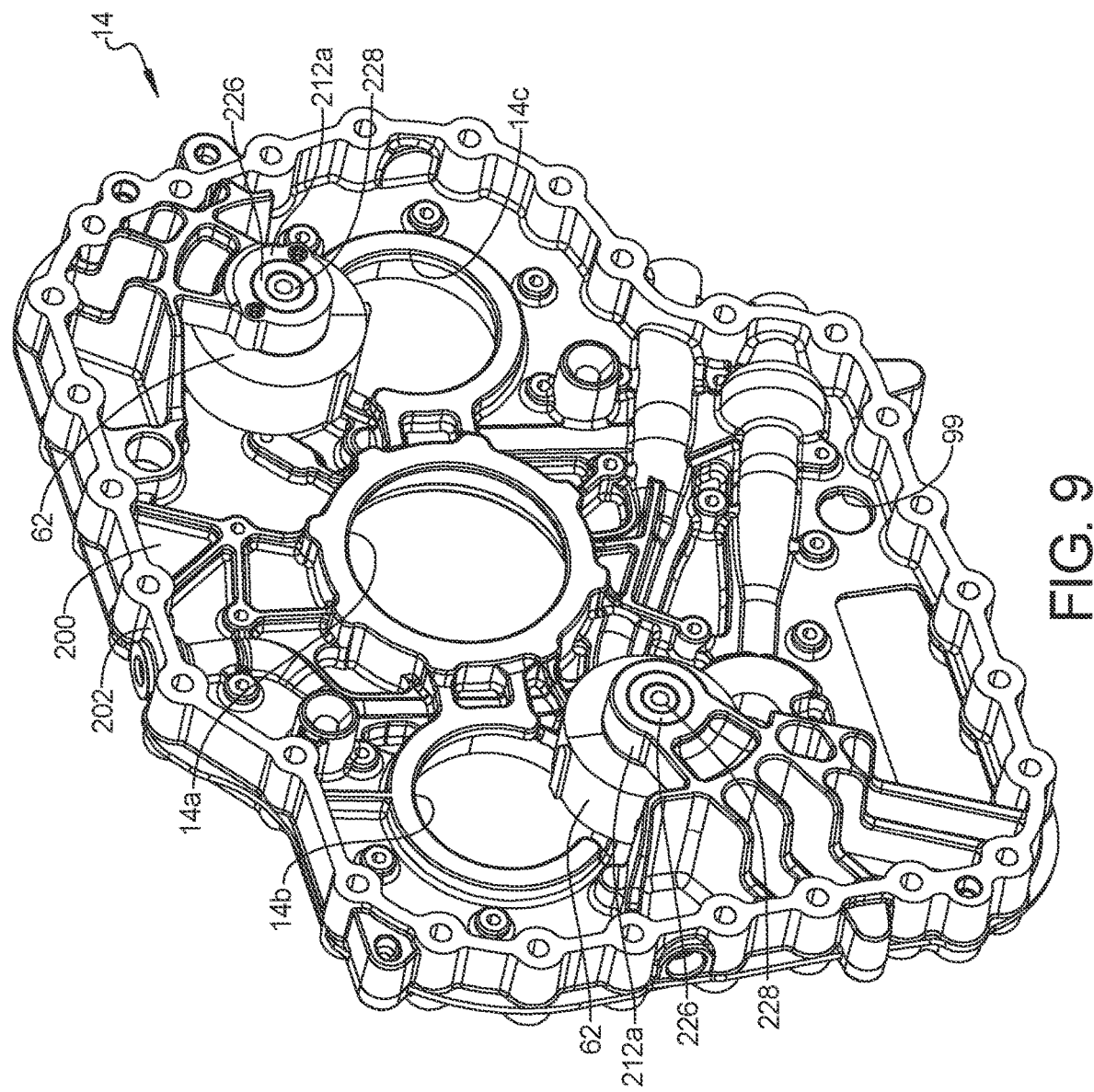
FIG. 9 is a front perspective view of the machined intermediate plate of the transmission closure having reverse idler gears mounted thereto.
Figure 10:
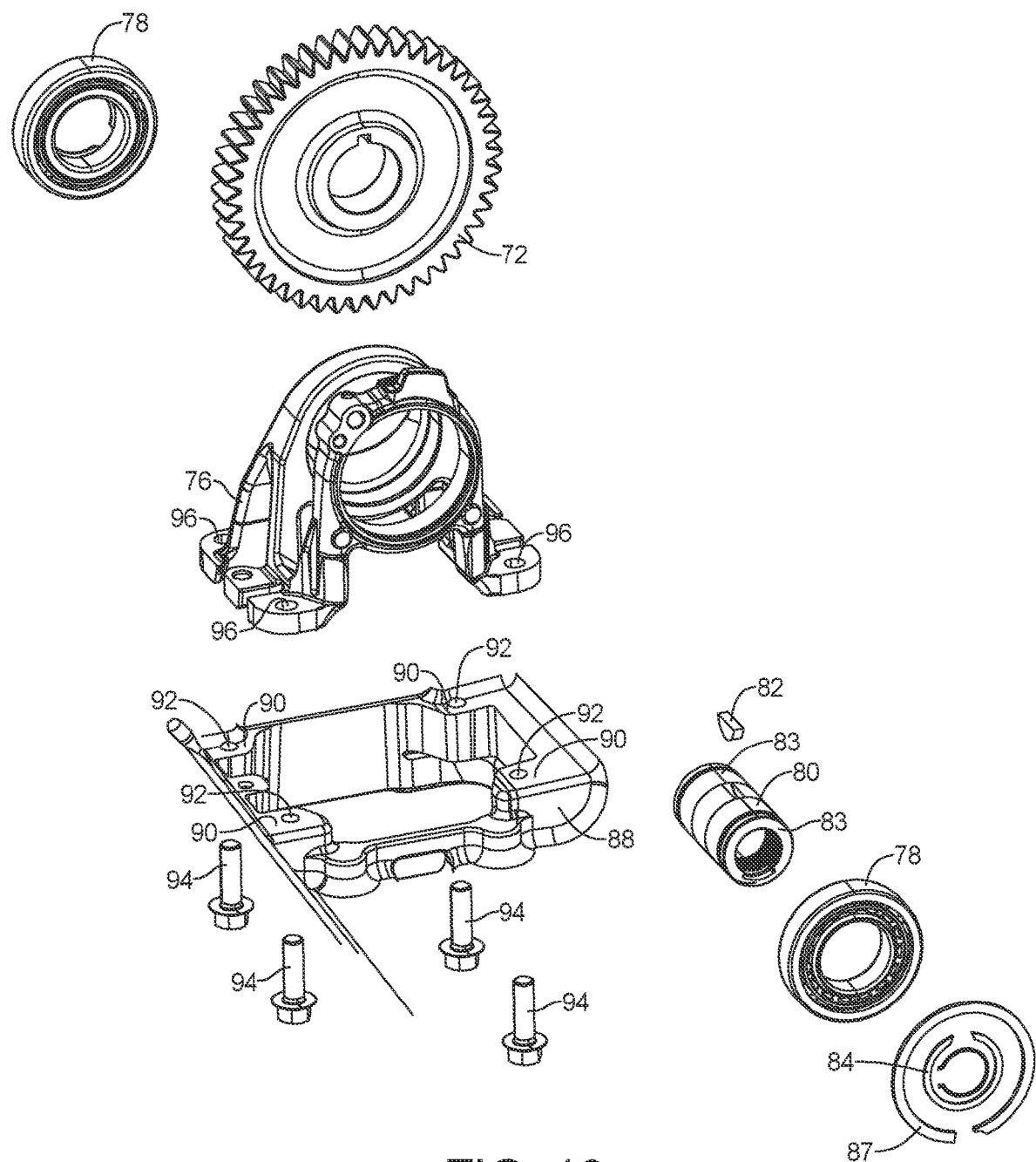
FIG. 10 is an exploded perspective view of a PTO driven gear, shaft, bearing, support housing and main transmission housing partial mounting section.
Figure 11:
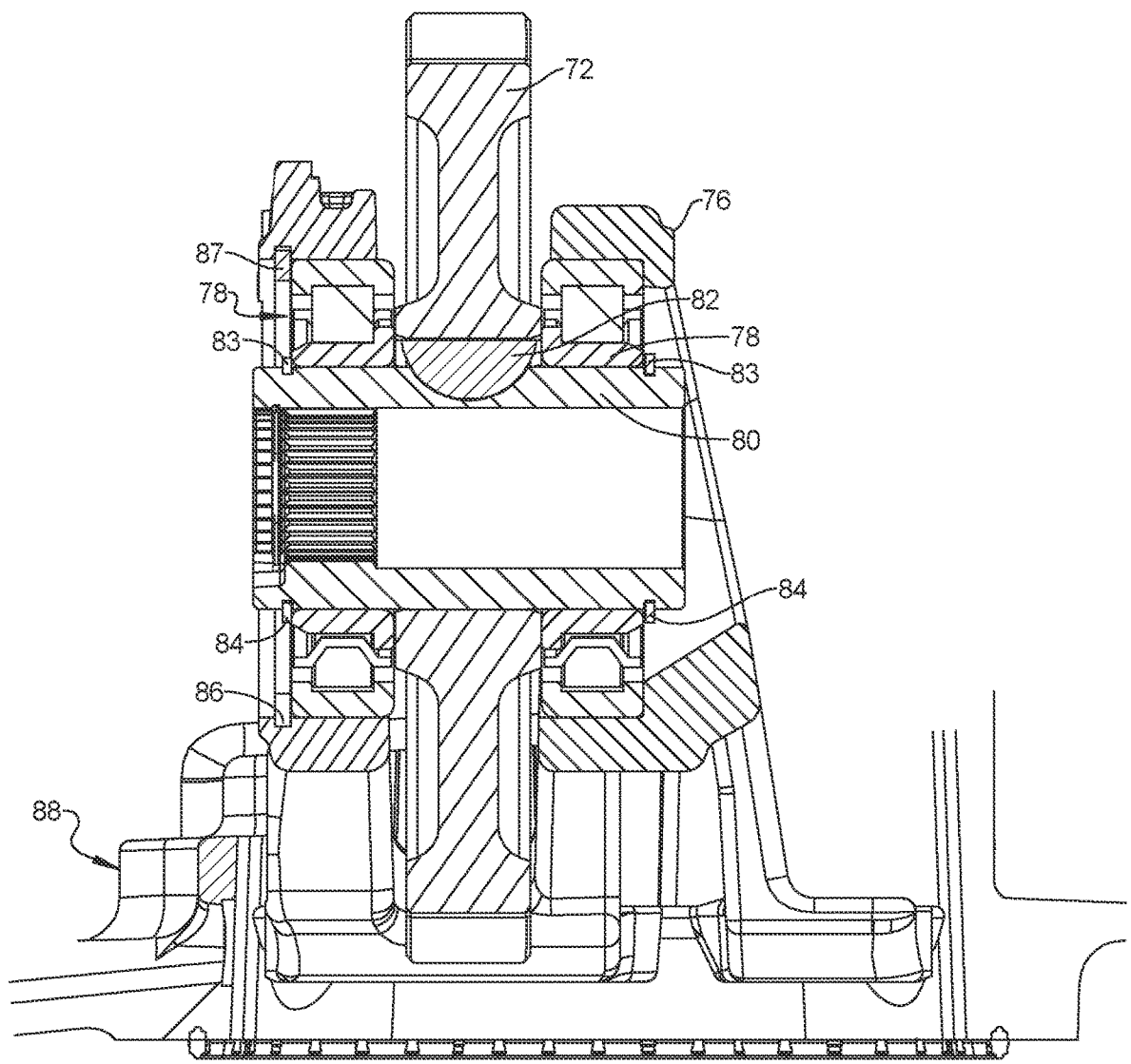
FIG. 11 is a cross-sectional view of the PTO driven gear support assembly and partial main transmission housing mounting section shown in FIG. 10.

As best shown in FIGS. 10 and 11, the PTO shaft 74 and the PTO driven gear 72 are each supported by a PTO pillow block housing 76 that supports a pair of roller bearings 78 that rotatably support a PTO gear shaft 80. The PTO driven gear 72 is connected to the PTO gear shaft 80 by a woodruff key 82. The PTO gear shaft 80 includes a pair of annular grooves 8 for receiving a pair of retaining rings 84 to secure the PTO gear shaft 80 within the roller bearings 78. As best shown in FIG. 11, the PTO pillow block housing 76 can include a recessed annular groove 86 for receiving a snap ring 87 to secure the roller bearings 78 within the PTO pillow block housing 76. The PTO pillow block housing 76 is mounted to and supported by a base frame 88, including four mounting ears 90 with threaded apertures 92 for receiving a plurality of mounting bolts 94 that extend through apertures 96 in the PTO pillow block housing 76. With continued reference to FIG. 2B, the PTO shaft 74 is supported at its forward end by the PTO pillow block housing 76 and is supported at its rear end by a bearing 98 supported within an aperture 99 (FIGS. 8 and 9) in the intermediate plate 14.

Figure 5:
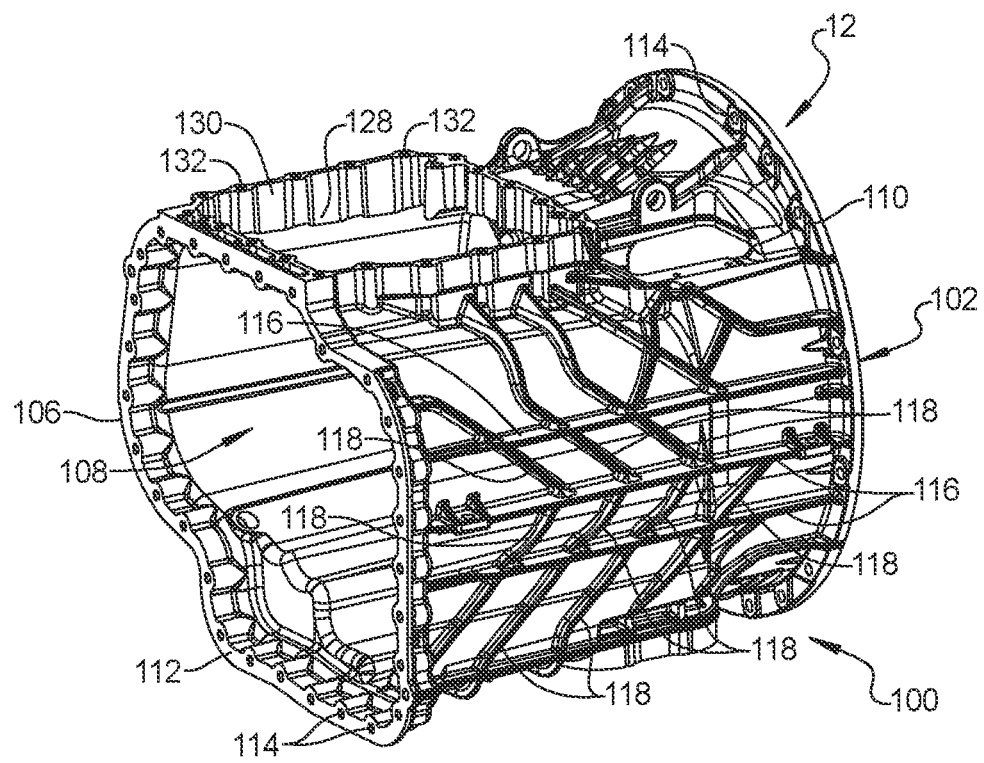
FIG. 5 is a right side rear perspective view of the main transmission housing according to the principles of the present disclosure.
Figure 6:
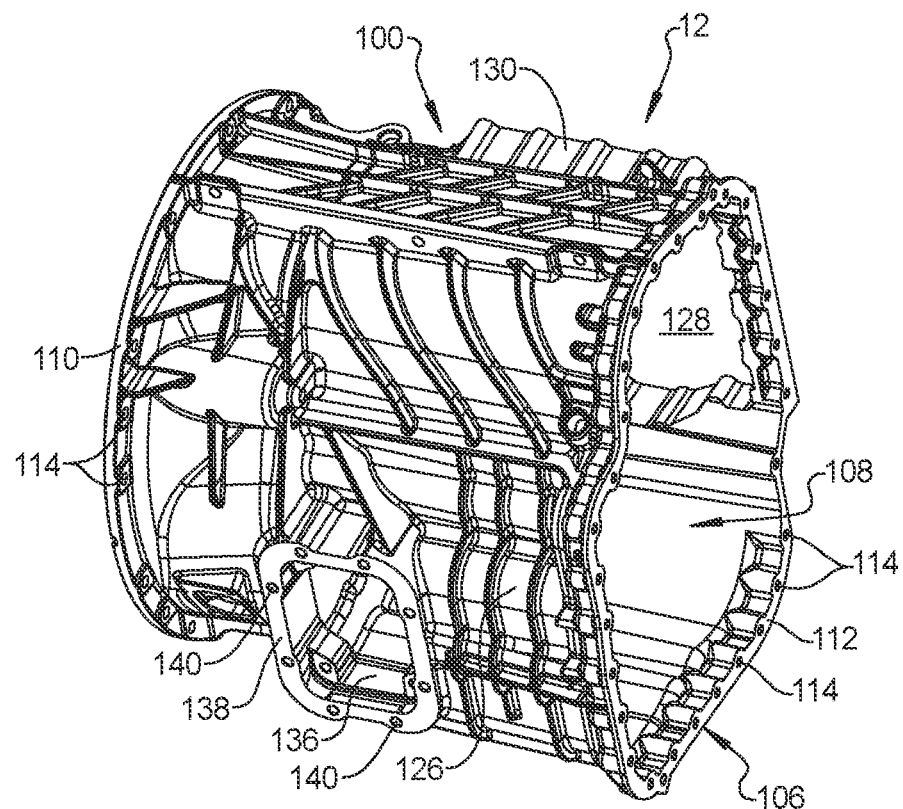
FIG. 6 is a bottom side rear perspective view of the main transmission housing according to the principles of the present disclosure.
Figure 7:
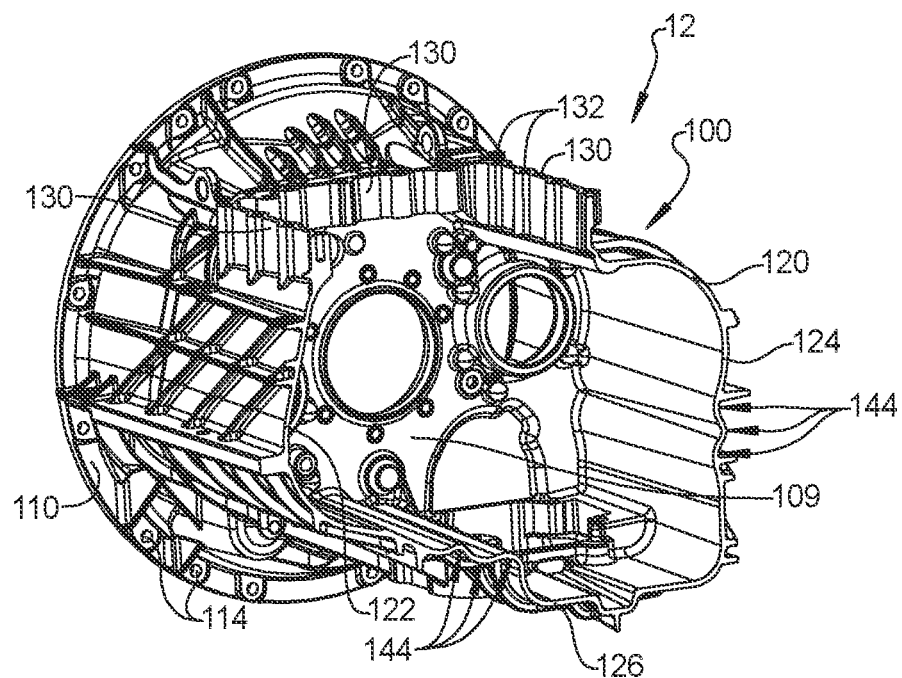
FIG. 7 is cutaway perspective view of the main transmission housing according to the principles of the present disclosure.

With reference to FIGS. 4-7, the main housing 12 includes a one-piece generally annular wall structure 100 made from cast aluminum. A front end 102 of the main housing 12 can define a clutch chamber 104 (FIGS. 2A, 2B) for receiving the clutch engagement yoke 32 of the clutch unit 22. A rear end 106 of the main housing 12 defines a transmission main chamber 108 for receiving the second main shaft portion 26 and the range shaft portion 28 and the countershafts 48a, 48b. As best shown in FIGS. 2A, 2B and 7, a partition wall 109 is disposed between the clutch chamber 104 and the transmission main chamber 108 and is integrally formed with the one-piece generally annular wall structure 100. The partition wall 109 includes a plurality of openings 109a, 109b, 109c (FIG. 2A) for receiving and supporting the extension shaft 24 and a first end of the countershafts 48a, 48b.

The intermediate plate 14 includes a plurality of openings 14a, 14b, 14c for receiving and supporting the main shaft 26 and the range shaft 28 and a second end of the countershafts 48a, 48b. The extension shaft 24 is supported at a forward end by a bearing 150 disposed in the opening 109a in the partition wall 109. A rearward end of the extension shaft is supported by roller bearing 152 disposed within a bore in the range shaft portion 28. A forward end of the range shaft portion 28 is supported within the opening 14a of the intermediate plate 14 by a bearing assembly 154. The main shaft 26 is rotatably supported on the extension shaft 24. A rear end of the main shaft has exterior splines which are engaged with interior splines on a forward end of the range shaft 28 radially within the bearing support 154.

Figure 3:
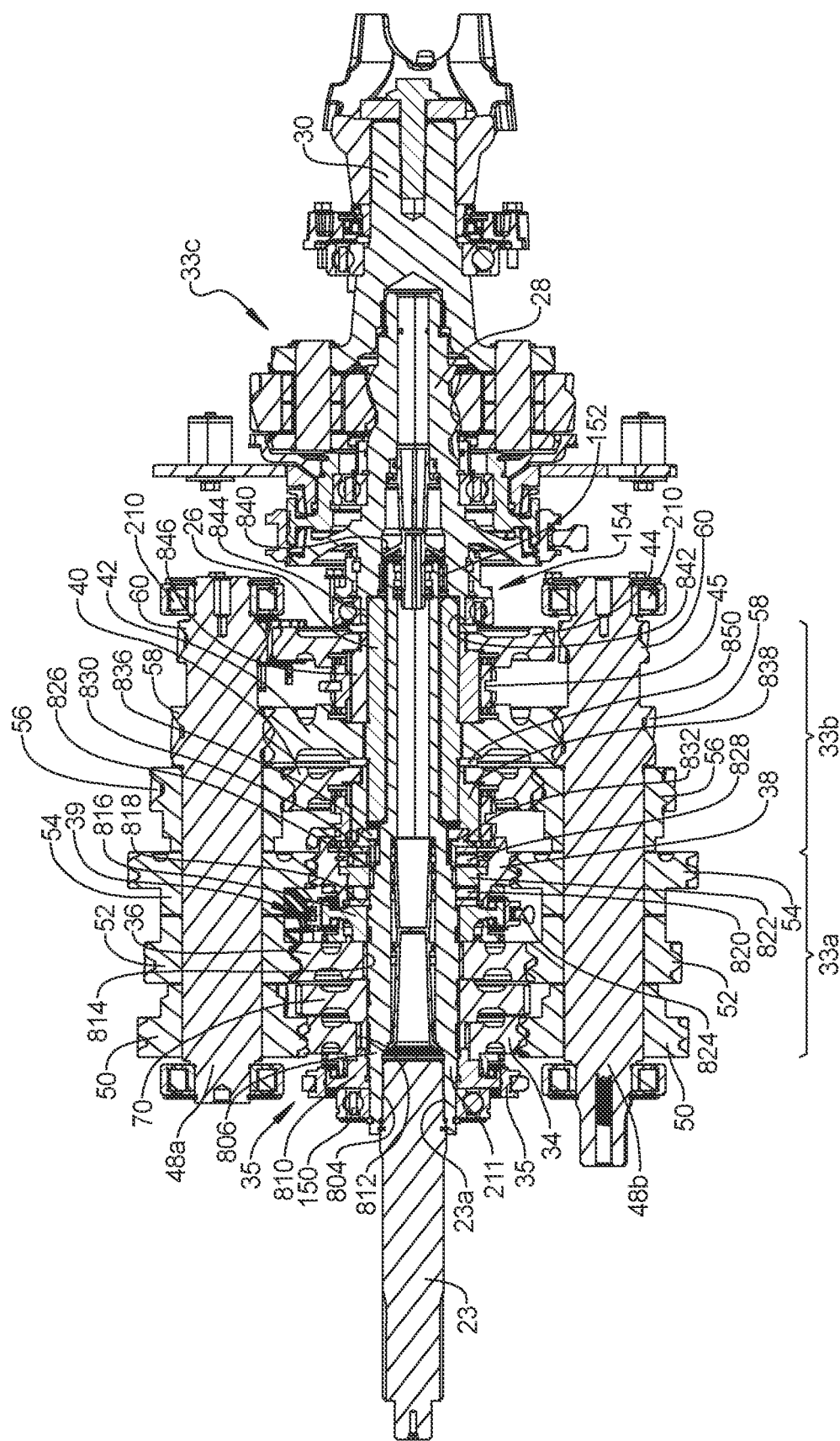
FIG. 3 is a partial cross-sectional view of the input shaft, extension shaft, main shaft and twin countershaft gear train system of the present disclosure with the housing removed for illustrative purposes.

With reference to FIG. 3, the extension shaft 24 includes interior splines 804 which are connected to exterior splines 23a of the input shaft 23. A forward end of the extension shaft 24a is supported by the bearing assembly 150. The forward end of the extension shaft 24a also includes an exterior spline 806 which is connected to an interior spline 308 of a clutch hub 810. The first splitter gear 34 is loosely supported on the extension shaft 24 by a needle bearing 812 and a second splitter gear 36 is loosely supported on the extension shaft 24 by a needle bearing 814. The first splitter gear 34 is disposed against the clutch hub 810 and against the PTO drive gear 70. The second splitter gear 36 is disposed against the PTO drive gear 70 and against a clutch hub 816 that is splined to the extension shaft 24. A thrust washer 818 is disposed between the clutch hub and a first thrust bearing 800 having cylindrical rollers 820 that are disposed against a thrust race 822. The third splitter gear 38 is supported with radial clearance on the thrust race 822. A sliding clutch 824 is supported on the clutch hub 816 and is engageable with the second splitter gear 36 and the third splitter gear 38. A second thrust bearing 826 having cylindrical rollers 828 is disposed against the thrust race 822. A thrust washer 830 is disposed against the second thrust bearing 826 and is disposed against a race 832. The race 832 includes a tapered rear surface that is disposed against a spherical washer 836. The spherical washer 836 is disposed against a clutch hub 838 and main shaft 26. Clutch hub 838 is splined to the main shaft 26. The two-sided slide clutch 41 is mounted to the clutch hub 838.

The range gear shaft 28 includes interior splines 842 that engage exterior splines 844 of the main shaft 26. The main box gear 40 is located by the clutch hub 838 and washer 850 and is engaged thereto by the slide clutch 41. The second main box gears 42 44 is selectively engaged to the main shaft 26 and located by washer 850 and clutch hub 846 that supports the sliding clutch 45. The third main box gear is selectively engaged to the main shaft 26 and is located by washer 852, spacer 854 and washer 856 and clutch hub 846 that supports the sliding clutch 45.

Figure 4:
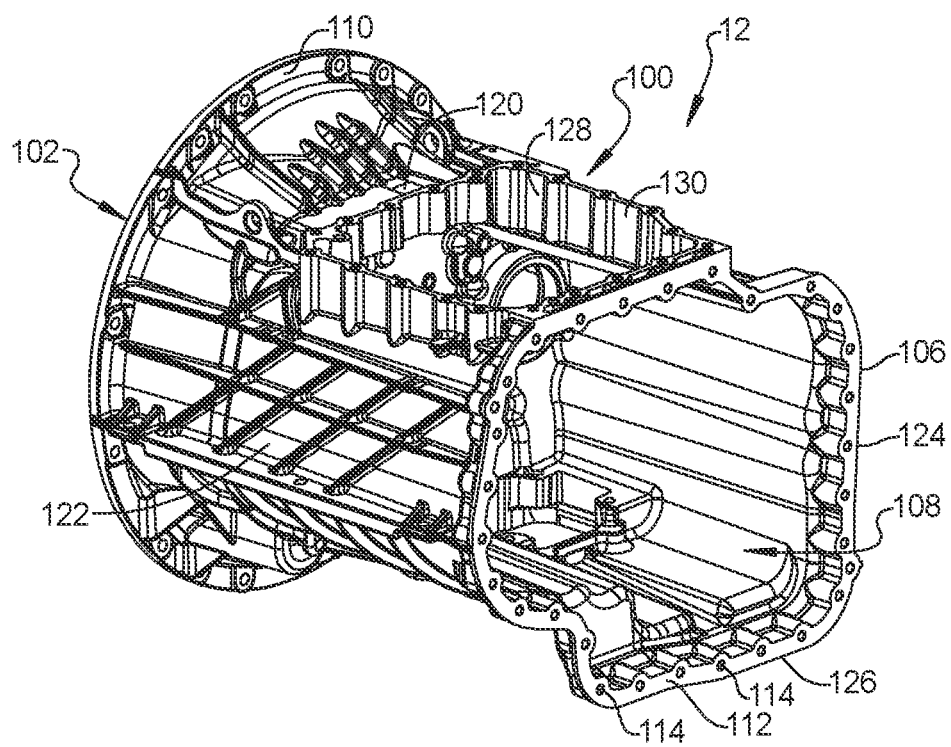
FIG. 4 is a left side rear perspective view of a main transmission housing according to the principles of the present disclosure.

With reference to FIGS. 4-6, the one-piece generally annular wall structure 100 of the main housing 12 has a forward mounting flange 110 and a rearward mounting flange 112 each having a plurality of apertures or bores 114 for receiving fasteners therein. The annular wall structure 100 can have a wall thickness of between 5.0 and 7.0 mm and preferably 6.0 mm in order to provide a reduced weight aluminum housing.

In order to further strengthen the annular wall structure 100 a plurality of axially extending raised ribs 116 can extend longitudinally from the front end 102 to the rear end 106 of the main housing 12. The axially extending raised ribs 116 provide part structure, reduce frequencies of the large panels of the main housing 100, and support material flow throughout the structure during casting of the main housing 100. In addition, a plurality of angularly extending raised ribs 118 extend diagonally between adjacent ones of the plurality of axially extending raised ribs 116. By "diagonally," it is meant that the plurality of angularly extending raised ribs 118 extend at an acute (non-perpendicular) angle from the axially extending raised ribs 116. The angularly extending raised ribs 118 provide part structure by connecting the longitudinal ribs 116 and further aid in material flow during casting of the main housing 100 thereby reducing turbulence and mitigating porosity.

As shown in FIG. 4, the one-piece generally annular wall structure 100 can include a top wall portion 120, a left side wall portion 122, a right side wall portion 124, and a bottom wall portion 126. The top wall portion 120 can include an actuator interface opening 128 with an actuator wall structure 130 extending radially outward from the top wall portion 120 of the generally annular wall structure 100. The actuator wall structure 130 can include a plurality of bores 132 for receiving fasteners for securing the actuator housing 18 within the actuator interface opening 128. As best shown in FIG. 6, the bottom wall portion 126 can include a PTO interface opening 136 with a PTO wall structure 138 extending radially outward from the bottom wall portion 126 of the generally annular wall structure 100. The PTO wall structure 138 can include a plurality of bores 140 for receiving fasteners for securing a PTO cover 142 over the PTO interface opening 136. As shown in FIG. 2B, the PTO cover 142 can include a cover body configured to envelope a portion of the PTO driven gear 72 so as to be in close proximity in-front, in-back and peripherally around a portion of the PTO driven gear 72 to limit oil and air resistance (i.e. windage) to the rotating PTO driven gear 72.

With reference to FIG. 7, a cut section of the main housing 12 is shown including a plurality of waves 144 disposed in the bottom wall portion 126 and the right sidewall portion 124. The waves 144 define an undulating surface and extend axially along the generally annular wall structure 100 and break up large flat panels of the wall portions 126, 124 by providing additional strength and reduced frequencies.

The design of the aluminum main housing 12 provides for a reduced weight housing with the required strength and noise reduction. The aluminum main housing 12 is also economically cast-able.

Figure 8:
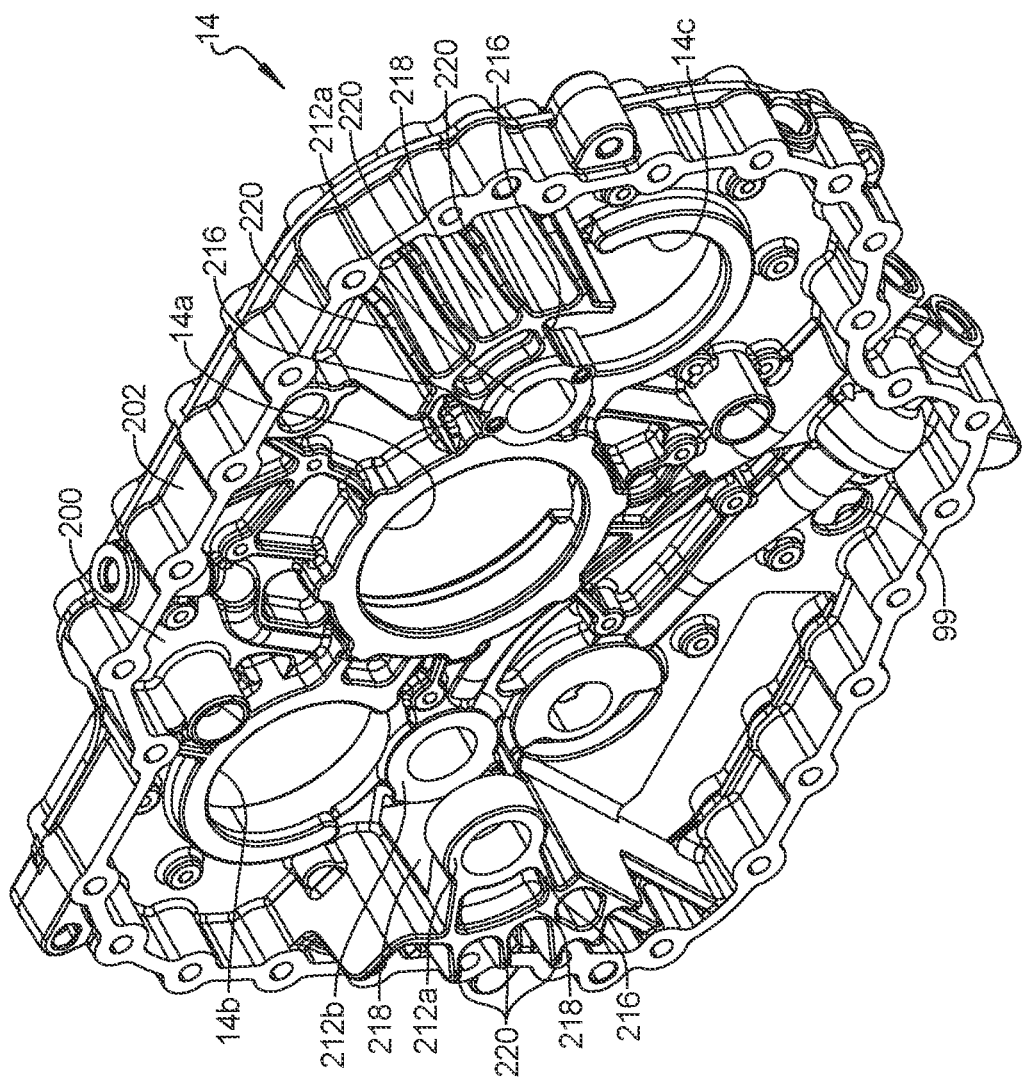
FIG. 8 is a front perspective view of the machined intermediate plate of the transmission enclosure.

With reference to FIGS. 8 and 9, the intermediate plate 14 of the transmission housing 10 will now be described. As shown in FIG. 8, the intermediate plate 14 includes a plate-like base 200 having a peripheral flange portion 202 extending around the plate-like base 200. The plate-like base 200 includes the center opening 14a for receiving the bearing 154 (best shown in FIG. 2B) for supporting the extension shaft 24, first main shaft portion 26 and second main shaft portion 28. The plate-like base 200 includes a pair of openings 14b, 14c laterally offset from the center opening 14a for receiving bearings 210 for supporting the countershafts 48a, 48b. The intermediate plate 14 further includes two pairs of axially spaced reverse idler support bosses 212a, 212b for supporting the pair of reverse idler gears 62, as best shown in FIG. 9. The support bosses 212a are supported by a bridge wall including a pair of side ribs 216, a mid-wall 218 and additional structural ribs 220 that extend from the mid wall 218 to the peripheral flange 202.

As shown in FIG. 9, the reverse idler support bosses 212a, 212b each include openings 226 that supports a reverse idler shaft 228 that supports the reverse idler gear 62. The reverse idler gears 62 each engage one of the aligning gears 60 of the countershafts 48a, 48b and with the gear 44 of the first main shaft portion 26.

With reference to FIG. 2B, the PTO shaft 74 is drivingly connected to an impeller of a transmission lube pump 230 that is mounted to the intermediate plate 14. The transmission lube pump 230 is driven by the PTO shaft 74 and supplies lubrication from an oil sump 232 at a bottom of the transmission housing 12, 14, 16 to interior passages 234 within the extension shaft 24 and range shaft 28 as well as other components of the transmission.

With continued reference to FIG. 2B, the end of the PTO shaft 74 can further be engaged with a rear mount PTO 240 extending from the rear housing 16.

Figure 12:
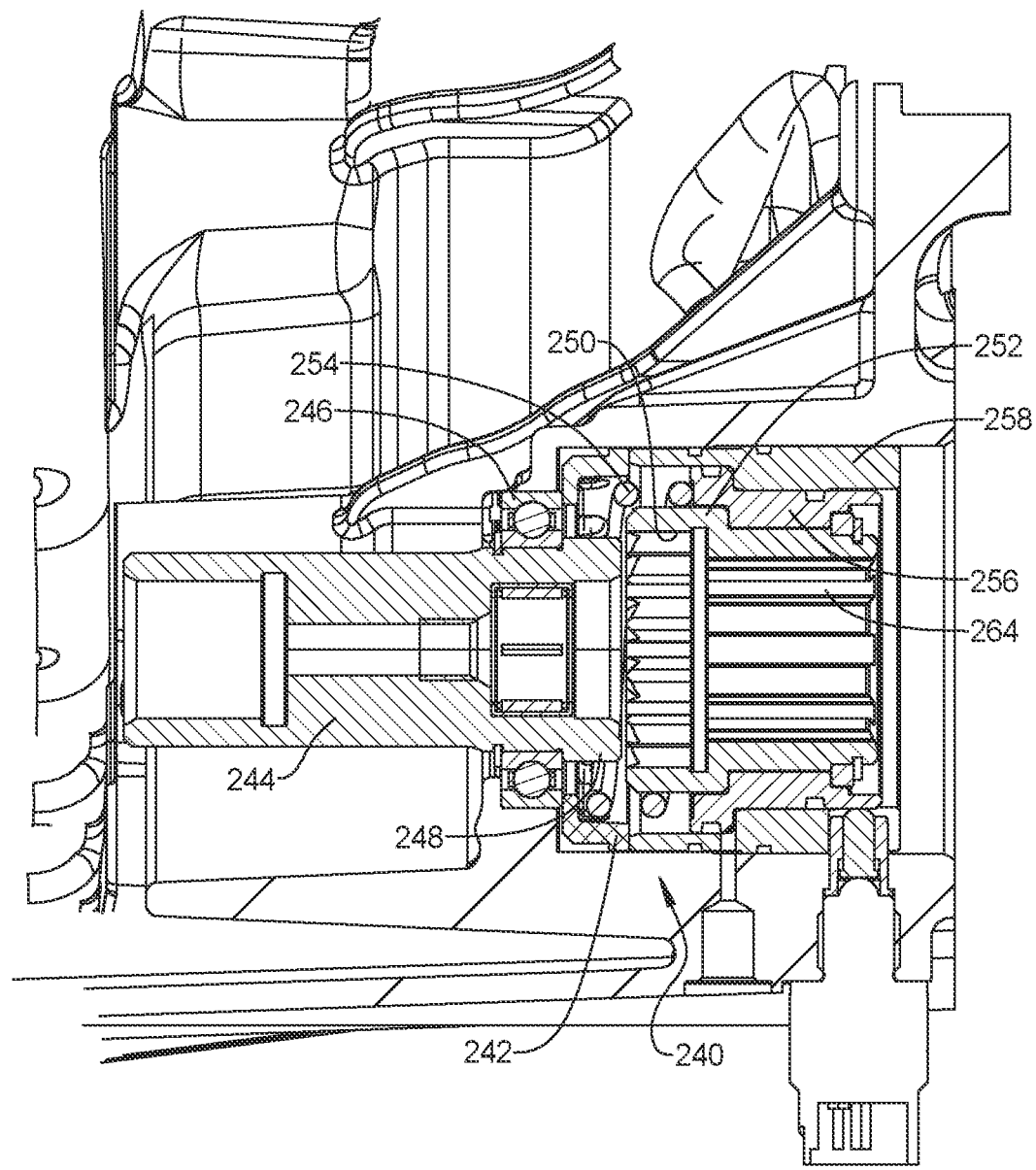
FIG. 12 is a cross-sectional view of a rear mount power take-off quill shaft and coupler unit.
Figure 13:
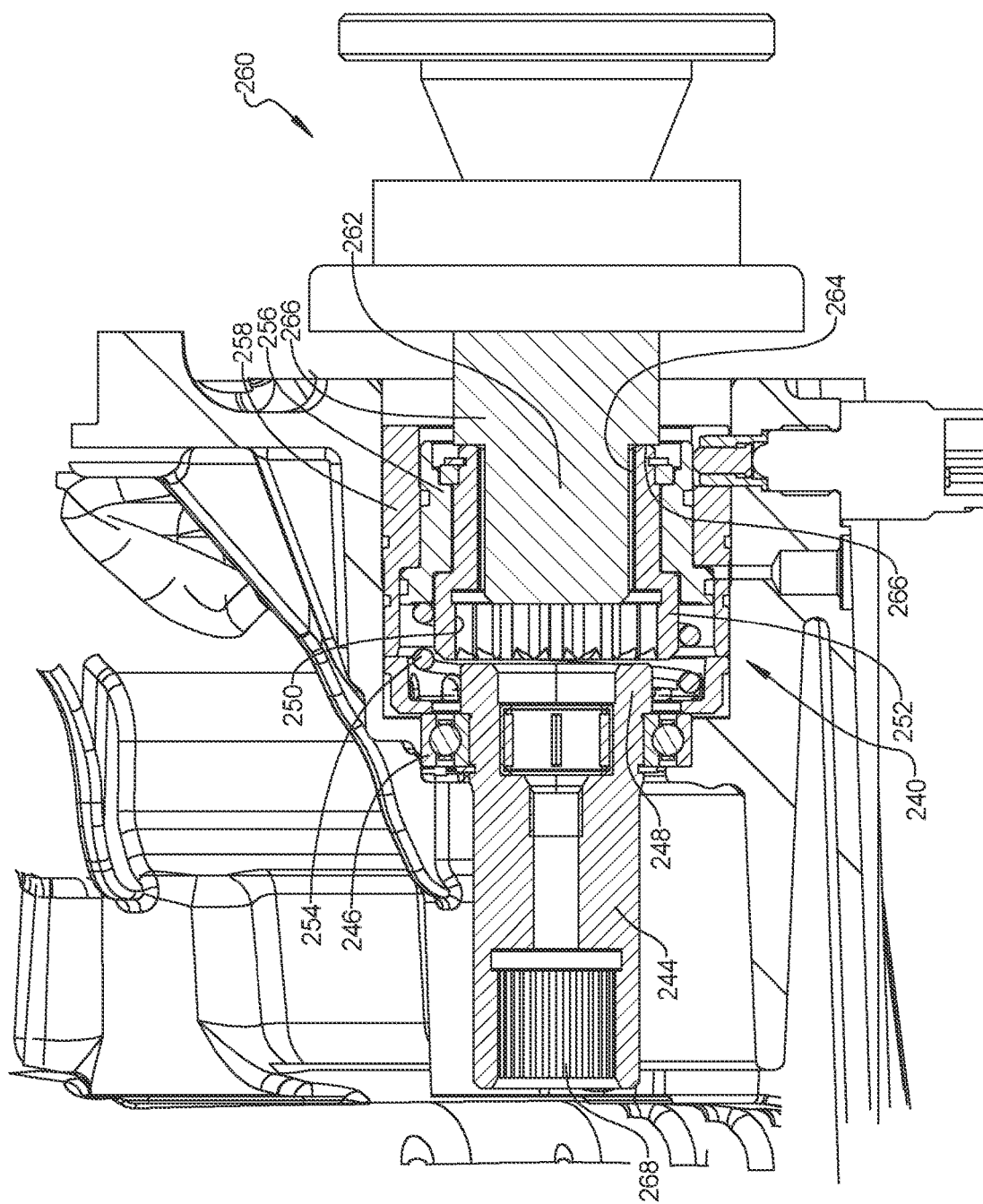
FIG. 13 is a cross-sectional view of a power take-off device connected to a rear mount power take-off quill shaft and coupler unit according to the principles of the present disclosure.

With reference to FIGS. 12 and 13, the rear mount PTO 240 is shown including a PTO housing 242 having a PTO input shaft 244 rotatably supported by a bearing 246. The PTO input shaft 244 includes an external spline 248 that can be engaged with a first internal spline 250 of a coupler sleeve 252. The coupler sleeve 252 is disposed within the PTO housing 242 and is biased by a spring 254 toward a disengaged position. The coupler sleeve 252 is connected to a guide sleeve 256 slidably received within a retainer 258 that limits axial movement of the guide sleeve 256.

With reference to FIG. 13, as a power take-off device 260 is engaged with the rear mount PTO 240, a splined shaft 262 is inserted into a second internal spline 264 of the coupler sleeve 252 in order to provide a driving connection to the power take-off device 260. The coupler sleeve 252 can be pressed by the splined shaft 262 or by another mechanism against the biasing force of the spring 254 into engagement with the external spline 248 of the PTO input shaft 244. In particular, the splined shaft 262 can include an external shoulder 266 that can engage the coupler sleeve 252 and press the coupler sleeve 252 into engagement with the PTO input shaft 244. When there is no PTO device 260 mounted to the rear mount PTO 240, the PTO input shaft 244 does not engage the coupler sleeve 252 and freewheels relative to the coupler sleeve 252. The PTO input shaft 244 can be integrally formed with the PTO shaft 74 or can be connected therewith by splines 268 or other known connecting systems.

The present disclosure utilizes a short input shaft 23 that is aligned with the engine flywheel pilot bearing and concentrically splined to the extension shaft 24 that is coaxial to the transmission 10. The three front splitter drive gears 34, 36, 38 are couple-able to the extension shaft 24 via synchronizer clutches 35 and 39. The extension shaft 24 may be constructed from one piece or from multiple joined pieces as best suits the manufacturing and assembly process and so that the extension shaft is rigid. The thrust roller bearing races 800, 826 are maintained on the transmission center axis to minimize radial displacement while the three splitter drive gears 34, 36, 38 and main shaft gears 40, 42, 44 are permitted to radially float for the twin countershaft design. The independent PTO drive gear 70 is directly affixed to the extension shaft 24 and utilizes an independent drive gear/shaft for PTO output means. The PTO output can be in at least two forms including the bottom mount gear meshing interface form or the rear mount shaft coupled interface form. This configuration affords a single speed ratio of the power takeoff (PTO) with respect to engine RPM. The PTO rear shaft is also configured to drive the transmission lube pump at a single speed ratio with respect to the engine speed. This transmission lube pump is then active in all transmission states when the main input disk clutch 22 is engaged with the engine.

According to a further aspect of the present disclosure, the power takeoff system utilizes the PTO drive gear 70 directly affixed to the extension shaft 24 and an independent driven gear/shaft 72/74 for the power takeoff output means. This configuration provides for the power takeoff mode to be available in all transmission ratios.

According to yet another aspect of the present disclosure, each end of the extension shaft 24 is configured to be supported by bearings and/or concentric shafts to observe the radial PTO mode loading. The radial PTO mode loads onto the extension shaft 24 have insignificant interaction with gear ratio loads when in PTO mobile mode. The PTO driven gear is affixed to a shaft mounted on bearings which in turn are directly or indirectly affixed to the transmission housing.

According to still another aspect of the present disclosure, the extension shaft is incorporated with significant radial clearance with the front two splitter drive gears 34, 36 to accommodate radial float. The radial float is required for the unloaded splitter drive gear when the opposite splitter drive gear is in the operating load path. The PTO radial loads observed by the affixed extension shaft 24 are independent of splitter gear selection.

The present disclosure incorporates two thrust bearings, one thrust bearing 800 between the second and third splitter drive gears 36, 38 and, a second thrust bearing 826 between the third splitter gear 38 and the main shaft 26 to address helical gearing thrust loads and a main shaft ball bearing to accommodate thrust for engine braking torque mode. Thrust for engine braking torque mode may also be accommodated by a splitter section thrust bearing, but is dependent upon the operating ratio. The present disclosure provides significant radial float incorporated into the interface of the third splitter gear 38 with respect to its mating thrust bearing race.

The present disclosure also incorporates an expanded center distance for the PTO driven gear output to accommodate output and yoke or output flange radial clearance with the rear mount PTO output yoke or direct mount pump. This PTO expanded center distance is independent of countershaft center distance.

Figure 14:
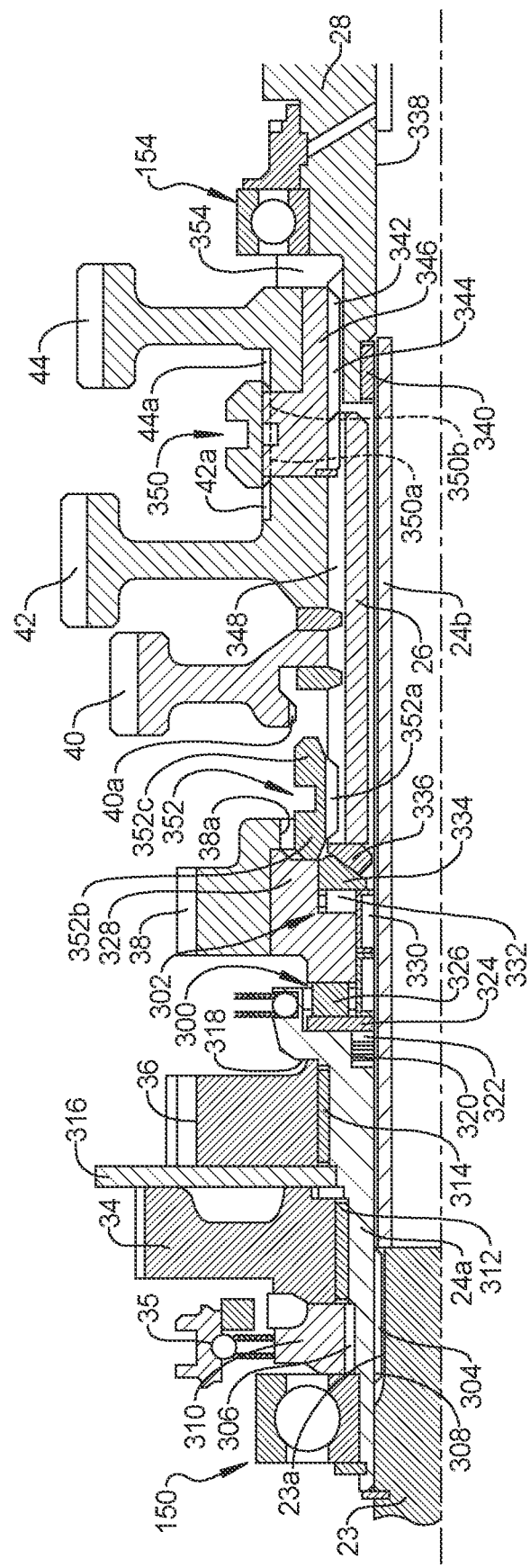
FIG. 14 is a cross-sectional view of the input shaft, an alternative two-piece extension shaft, a main shaft and thrust bearings according to a first alternative embodiment.

With reference to FIG. 14, an alternative arrangement of the input shaft 23, an alternative two-piece extension shaft 24a, 24b, a main shaft 26, a range shaft 28 and thrust bearings 300, 302 according to a first alternative embodiment. The transmission 10 is capable of providing power throughput from a prime mover (not shown) interfacing with a clutch unit 22 to the input shaft 23, from the input shaft 23 to the two-piece extension shaft 24a, 24b, from the two-piece extension shaft 24a, 24b to a main shaft portion 26, from the main shaft portion 26 to a range shaft portion 28, and from the range shaft portion 28 to an output shaft assembly 30, not shown in FIG. 14.

As shown in FIG. 14, the secondary extension shaft 24b is press fit or otherwise connected to the primary extension shaft 24a. The primary extension shaft 24a includes interior splines 304 which are connected to exterior splines 23a of the input shaft 23. A forward end of the primary extension shaft 24a is supported by the bearing assembly 150. The primary extension shaft 24a also includes an exterior spline 306 which is connected to an interior spline 308 of a clutch hub 310. A first splitter gear 34 is loosely supported on the primary extension shaft 24a by a needle bearing 312 and a second splitter gear 36 is loosely supported on the primary extension shaft 24a by a needle bearing 314. The first splitter gear 34 is disposed against the clutch hub 310 and against a thrust washer 316. The second splitter gear 36 is disposed against the thrust washer 316 and against a shoulder 318 of the primary extension shaft 24a. An axial end of the primary extension shaft 24a includes a recessed pocket 320 receiving a wave spring 322 that is disposed against a thrust washer 324. A first thrust bearing 300 having a plurality of cylindrical rollers 326 is disposed against the thrust washer 324 and against a thrust race 328 which is supported on the secondary extension shaft 24b by a needle bearing 330. The third splitter gear 38 is supported on the thrust race 328. The third splitter gear 38 is supported with radial clearance with respect to thrust race 328. Thrust race 328 is supported on the extension shaft 24b by needle bearing 330. A second thrust bearing 302 having a plurality of cylindrical rollers 332 is disposed against the thrust race 328. A race 334 is disposed against the second thrust bearing 302 and includes a tapered rear surface that is disposed against a spherical washer 336. The spherical washer 336 is disposed against an end of the main shaft 26.

A rearward end of the secondary extension shaft 24b is supported within a bore 338 of the range shaft 28 by a needle bearing 340. The range gear shaft 28 includes exterior splines 342 that engage interior splines 344 of a clutch hub 346. The interior splines 344 of the clutch hub 360 are also engaged with exterior splines 348 of the main shaft 26. The main box gears 40 and 42 are both located on the main shaft 26 and the main box gear 44 is located on the clutch hub 346. A second sliding clutch 350 is supported on the clutch hub 346 and includes clutch teeth 350a, 350b for engaging the corresponding clutch teeth 42a, 44a of the main box gears 42, 44, respectively. A third sliding clutch 352 includes interior splines 352a engaged with the exterior splines 348 of the main shaft 26 and includes exterior clutch teeth 352b, 352c which can be engaged with clutch teeth 38a, 40a of splitter gear 38 or main box gear 40, respectively. The range gear shaft 28 is supported by a ball bearing assembly 154 and the main box gear 44 is separated from the ball bearing assembly 154 by a spacer 354 which transmits thrust loads to the inner bearing race from the clutch hub 346.

Figure 15:
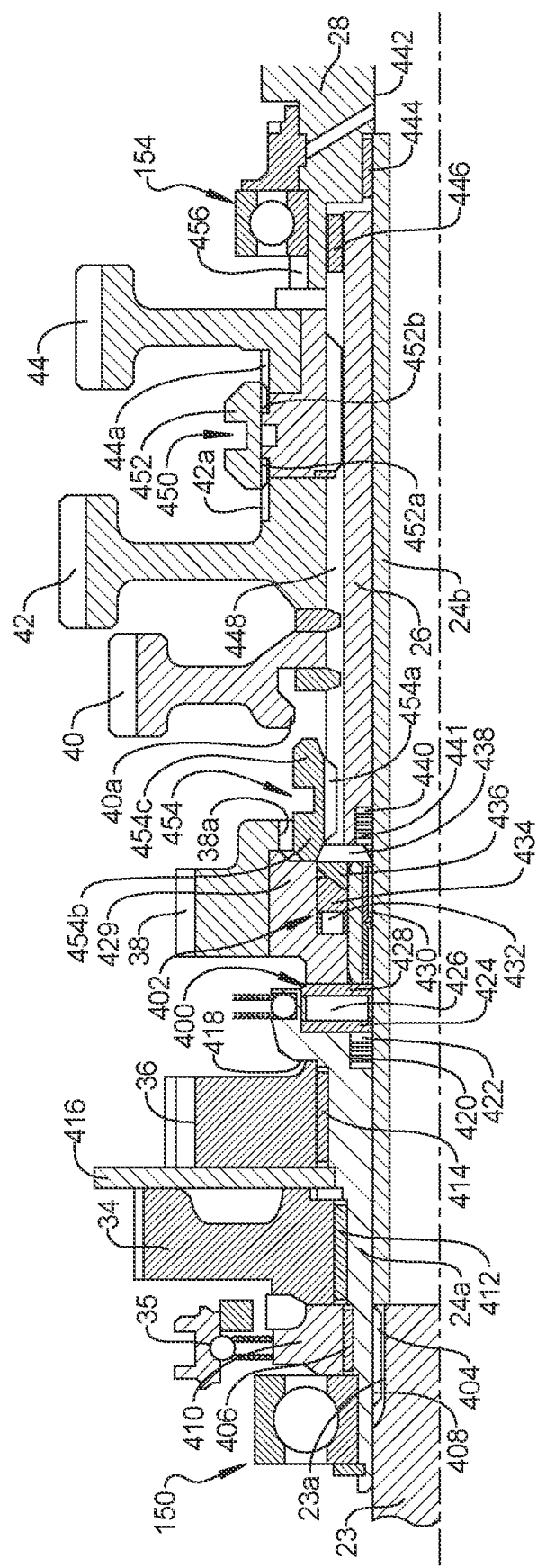
FIG. 15 is a cross-sectional view of the input shaft, an alternative two-piece extension shaft, a main shaft and thrust bearings according to a second alternative embodiment.

With reference to FIG. 15, a second alternative arrangement of the input shaft 23, an alternative two-piece extension shaft 24a, 24b, a main shaft 26, a range shaft 28 and thrust bearings 400, 402 according to a second alternative embodiment, wherein like reference numerals are used to reference the same or similar elements. The transmission 10 is capable of providing power throughput from a prime mover (not shown) interfacing with a clutch unit 22 to the input shaft 23, from the input shaft 23 to the two-piece extension shaft 24a, 24b, from the two-piece extension shaft 24a, 24b to a main shaft portion 26, from the main shaft portion 26 to a range shaft portion 28, and from the range shaft portion 28 to an output shaft assembly 30, not shown in FIG. 15. As shown in FIG. 15, the secondary extension shaft 24b is press fit or otherwise connected to the primary extension shaft 24a. The primary extension shaft 24a includes interior splines 404 which are connected to exterior splines 23a of the input shaft 23. A forward end of the primary extension shaft 24a is supported by the bearing assembly 150. The primary extension shaft 24a also includes an exterior spline 406 which is connected to an interior spline 408 of a clutch hub 410. A first splitter gear 34 is loosely supported on the primary extension shaft 24a by a needle bearing 412 and a second splitter gear 36 is loosely supported on the primary extension shaft 24a by a needle bearing 414. The first splitter gear 34 is disposed against the clutch hub 410 and against a thrust washer 416. The second splitter gear 36 is disposed against the thrust washer 416 and against a shoulder 418 of the primary extension shaft 24a. An axial end of the primary extension shaft 24a includes a recessed pocket 420 receiving a wave spring 422 that is disposed against a first thrust washer 424. A first thrust bearing 400 having a plurality of cylindrical rollers 426 is disposed against the thrust washer 424 and against a second thrust washer 428 which is supported against a thrust race 429 which is supported on the secondary extension shaft 24b by a needle bearing 430. The third splitter gear 38 is supported on the thrust race 429. The third splitter gear 38 is supported with radial clearance with respect to thrust race 429. A second thrust bearing 402 having a plurality of cylindrical rollers 432 is disposed against the thrust race 429. A race 434 is disposed against the second thrust bearing 402 and includes a tapered rear surface that is disposed against a spherical washer 436. The spherical washer 436 is disposed against a flat washer 438 which is disposed against an end of the main shaft 26. A wave spring 440 is disposed in an end pocket 441 in the main shaft 26 and presses against the flat washer 438.

A rearward end of the secondary extension shaft 24b is supported within a bore 442 of the range gear shaft 28 by a needle bearing 444. The range gear shaft 28 includes interior splines 446 that engage exterior splines 448 of the main shaft 26. The main box gears 40 and 42 are both located on the main shaft 26 and the main box gear 44 is located on a clutch hub 450. A second sliding clutch 452 is supported on the clutch hub 450 and includes clutch teeth 452a, 452b for engaging the corresponding clutch teeth 42a, 44a of the main box gears 42, 44, respectively. A third sliding clutch 454 includes interior splines 454a engaged with the exterior splines 448 of the main shaft 26 and includes exterior clutch teeth 454b, 454c which can be engaged with clutch teeth 38a, 40a of splitter gear 38 or main box gear 40, respectively. The range gear shaft 28 is supported by a ball bearing assembly 154 and the main box gear 44 is separated from the ball bearing assembly 154 by a spacer 456 which transmits thrust loads to the inner bearing race from the clutch hub 450.

Figure 16:
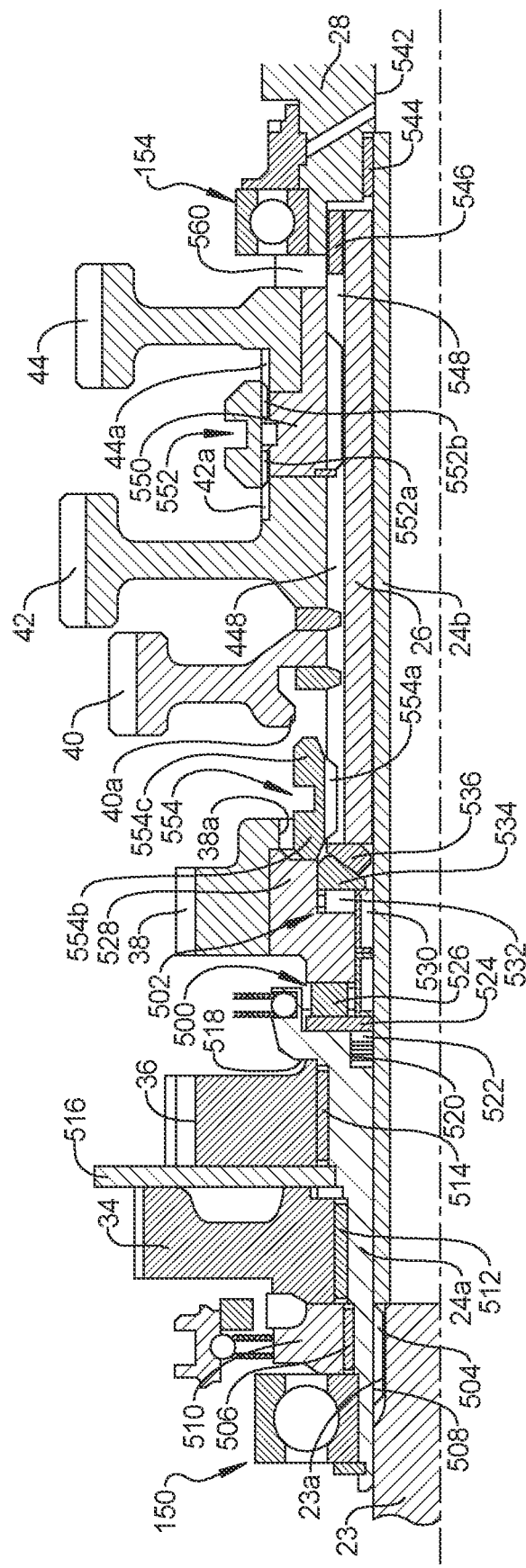
FIG. 16 is a cross-sectional view of the input shaft, an alternative two-piece extension shaft, a main shaft and thrust bearings according to a third alternative embodiment.

With reference to FIG. 16, an alternative arrangement of the input shaft 23, an alternative two-piece extension shaft 24a, 24b, a main shaft 26, a range shaft 28 and thrust bearings 500, 502 according to a third alternative embodiment. The transmission 10 is capable of providing power throughput from a prime mover (not shown) interfacing with a clutch unit 22 to the input shaft 23, from the input shaft 23 to the two-piece extension shaft 24a, 24b, from the two-piece extension shaft 24a, 24b to a main shaft portion 26, from the main shaft portion 26 to a range shaft portion 28, and from the range shaft portion 28 to an output shaft assembly 30, not shown in FIG. 16. As shown in FIG. 16, the secondary extension shaft 24b is press fit or otherwise connected to the primary extension shaft 24a. The primary extension shaft 24a includes interior splines 504 which are connected to exterior splines 23a of the input shaft 23. A forward end of the primary extension shaft 24a is supported by the bearing assembly 150. The primary extension shaft 24a also includes an exterior spline 506 which is connected to an interior spline 508 of a clutch hub 510. A first splitter gear 34 is loosely supported on the primary extension shaft 24a by a needle bearing 512 and a second splitter gear 36 is loosely supported on the primary extension shaft 24a by a needle bearing 514. The first splitter gear 34 is disposed against the clutch hub 510 and against a thrust washer 516. The second splitter gear 36 is disposed against the thrust washer 516 and against a shoulder 518 of the primary extension shaft 24a. An axial end of the primary extension shaft 24a includes a recessed pocket 520 receiving a wave spring 522 that is disposed against a thrust washer 524. The first thrust bearing 500 having a plurality of cylindrical rollers 526 disposed against the thrust washer 524 and against a thrust race 528 which is supported on the secondary extension shaft 24b by a needle bearing 530. The third splitter gear 38 is supported with radial clearance with respect to thrust race 528. The second thrust bearing 502 includes a plurality of cylindrical rollers 532 disposed against the thrust race 528. A race 534 is disposed against the second thrust bearing 502 and includes a tapered rear surface that is disposed against a spherical washer 536. The spherical washer 536 is disposed against an end of the main shaft 26.

A rearward end of the secondary extension shaft 24b is supported within a bore 542 of the range gear shaft 28 by a needle bearing 544. The range gear shaft 28 includes interior splines 546 that engage exterior splines 548 of the main shaft 26. Like the embodiment of FIG. 15, the main box gears 40 and 42 are both located on the main shaft 26 and the main box gear 44 is located on a clutch hub 550. A second sliding clutch 552 is supported on the clutch hub 550 and includes clutch teeth 552a, 552b for engaging the corresponding clutch teeth 42a, 44a of the main box gears 42, 44, respectively. A third sliding clutch 554 includes interior splines 554a engaged with the exterior splines 548 of the main shaft 26 and includes exterior clutch teeth 554b, 554c which can be engaged with clutch teeth 38a, 40a of splitter gear 38 or main box gear 40, respectively. The range gear shaft 28 is supported by a ball bearing assembly 154 and the main box gear 44 is separated from the ball bearing assembly 154 by a spacer 560 which transmits thrust loads to the inner bearing race from the clutch hub 550.

Figure 17:
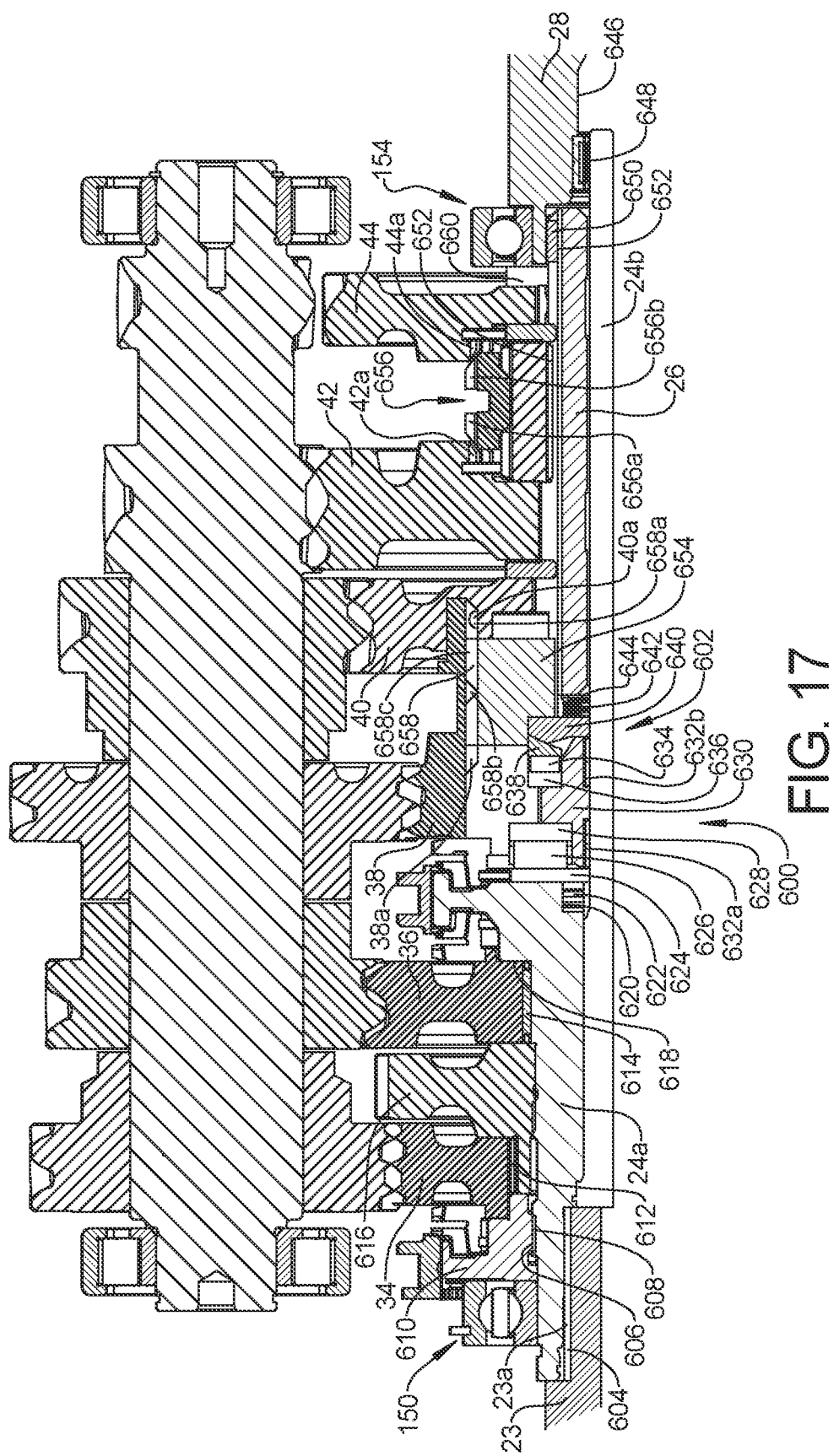
FIG. 17 is a cross-sectional view of the input shaft, an alternative two-piece extension shaft, a main shaft and thrust bearings according to a fourth alternative embodiment.

With reference to FIG. 17 an alternative arrangement of the input shaft 23, an alternative two-piece extension shaft 24a, 24b, a main shaft 26, a range shaft 28 and thrust bearings 600, 602 according to a fourth alternative embodiment. The transmission 10 is capable of providing power throughput from a prime mover (not shown) interfacing with a clutch unit 22 to the input shaft 23, from the input shaft 23 to the two-piece extension shaft 24a, 24b, from the two-piece extension shaft 24a, 24b to a main shaft portion 26, from the main shaft portion 26 to a range shaft portion 28, and from the range shaft portion 28 to an output shaft assembly 30, not shown in FIG. 17. As shown in FIG. 17, the secondary extension shaft 24b is press fit or otherwise connected to the primary extension shaft 24a. The primary extension shaft 24a includes interior splines 604 which are connected to exterior splines 23a of the input shaft 23. A forward end of the primary extension shaft 24a is supported by the bearing assembly 150. The primary extension shaft 24a also includes an exterior spline 606 which is connected to an interior spline 608 of a clutch hub 610. A first splitter gear 34 is loosely supported on the primary extension shaft 24a by a needle bearing 612 and a second splitter gear 36 is loosely supported on the primary extension shaft 24a by a needle bearing 614. The first splitter gear 34 is disposed against the clutch hub 610 and against a PTO drive gear 616. The second splitter gear 36 is disposed against the PTO drive gear 616 and against a shoulder 618 of the primary extension shaft 24a. An axial end of the primary extension shaft 24a includes a recessed pocket 620 receiving a wave spring 622 that is disposed against a thrust washer 624. The first thrust bearing 600 having a plurality of cylindrical rollers 626 disposed against the thrust washer 624 and against a thrust washer 628 which is disposed against a bearing race 630. The bearing race 630 is supported on the secondary extension shaft 24b by a pair of needle bearings 632a, 632b. The third splitter gear 38 is supported with radial clearance respect to the bearing race 630. The second thrust bearing 602 includes a plurality of cylindrical rollers 634 disposed against a thrust washer 636 that is disposed against the bearing race 630. A race 638 is disposed against the second thrust bearing 602 and includes a tapered rear surface that is disposed against a spherical washer 640. The spherical washer 640 is disposed against an end of the main shaft 26. A wave spring 642 is disposed in an end pocket 644 in the main shaft 26 and presses against the spherical washer 640.

A rearward end of the secondary extension shaft 24b is supported within a bore 646 of the range gear shaft 28 by a needle bearing 648. The range gear shaft 28 includes interior splines 650 that engage exterior splines 652 of the main shaft 26. The main box gears 42 and 44 are both located on the main shaft 26. A second sliding clutch 656 is supported on the clutch hub 654 and includes clutch teeth 656a, 656b for engaging the corresponding clutch teeth 42a, 44a of the main box gears 42, 44, respectively. A third sliding clutch 658 includes interior splines 658a engaged with the exterior splines 652 of the clutch hub 654 and includes exterior clutch teeth 654b, 654c which can be engaged with clutch teeth 38a, 40a of splitter gear 38 or main box gear 40, respectively. The range gear shaft 28 is supported by a ball bearing assembly 154 and the main box gear 44 is separated from the ball bearing assembly 154 by a spacer 660 which transmits thrust loads to the inner bearing race from the clutch hub 50.

Figure 18:
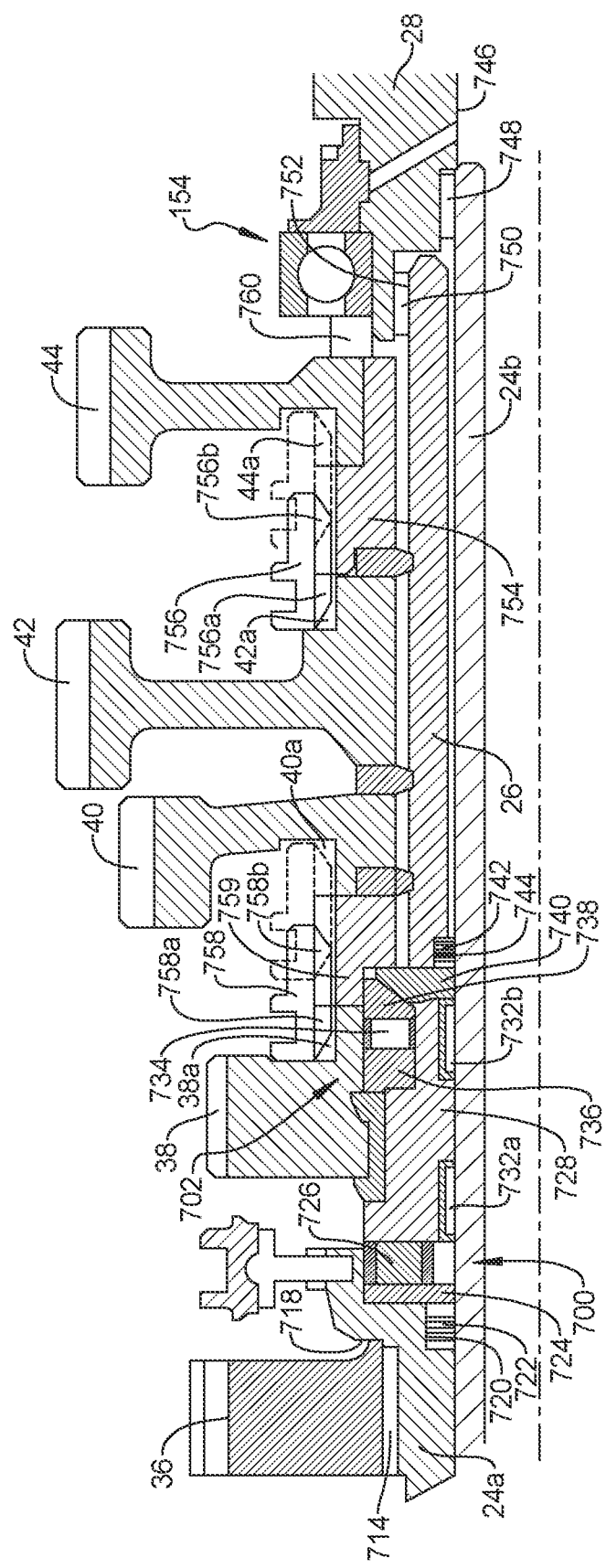
FIG. 18 is a cross-sectional view of the input shaft, an alternative two-piece extension shaft, a main shaft and thrust bearings according to a fifth alternative embodiment.

With reference to FIG. 18 an alternative arrangement of the input shaft 23, an alternative two-piece extension shaft 24a, 24b, a main shaft 26, a range shaft 28 and thrust bearings 700, 702 according to a fifth alternative embodiment. The transmission 10 is capable of providing power throughput from a prime mover (not shown) interfacing with a clutch unit 22 to the input shaft 23, from the input shaft 23 to the two-piece extension shaft 24a, 24b, from the two-piece extension shaft 24a, 24b to a main shaft portion 26, from the main shaft portion 26 to a range shaft portion 28, and from the range shaft portion 28 to an output shaft assembly 30. The secondary extension shaft 24b is press fit or otherwise connected to the primary extension shaft 24a. The primary extension shaft 24a includes interior splines which are connected to exterior splines 23a of the input shaft 23. A forward end of the primary extension shaft 24a is supported by the bearing assembly 150 as described herein previously. The primary extension shaft 24a also includes an exterior spline which is connected to an interior spline of a clutch hub. A first splitter gear 34 is loosely supported on the primary extension shaft 24a by a needle bearing and a second splitter gear 36 is loosely supported on the primary extension shaft 24a by a needle bearing 714. The first splitter gear 34 is disposed against the clutch hub and against a thrust washer as described herein previously. The second splitter gear 36 is disposed against the thrust washer and against a shoulder 718 of the primary extension shaft 24a. An axial end of the primary extension shaft 24a includes a recessed pocket 720 receiving a wave spring 722 that is disposed against a thrust washer 724. The first thrust bearing 700 having a plurality of cylindrical rollers 726 disposed against the thrust washer 724 and against a thrust race 728. The thrust race 728 is supported on the secondary extension shaft 24b by a pair of needle bearings 732a, 732b. The third splitter gear 38 is supported with radial clearance with respect to the thrust race 728. The second thrust bearing 702 includes a plurality of cylindrical rollers 734 disposed against a thrust washer 736 that is disposed against the bearing race 728. A race 738 is disposed against the second thrust bearing 702 and includes a tapered rear surface that is disposed against a spherical washer 740. The spherical washer 740 is disposed against an end of the main shaft 26. A wave spring 742 is disposed in an end pocket 744 in the main shaft 26 and presses against the spherical washer 740.

A rearward end of the secondary extension shaft 24b is supported within a bore 746 of the range gear shaft 28 by a needle bearing 748. The range gear shaft 28 includes interior splines 750 that engage exterior splines 752 of the main shaft 26. The main box gears 40 and 42 are both located on the main shaft 26 and the main box gear 44 is located on a clutch hub 754. A second sliding clutch 756 is supported on the clutch hub 754 and includes clutch teeth 756a, 756b for engaging the corresponding clutch teeth 42a, 44a of the main box gears 42, 44, respectively. A third sliding clutch 758 includes interior splines 758a engaged with the exterior splines 752 of a clutch hub 759 and includes exterior clutch teeth 754b, 754c which can be engaged with clutch teeth 38a, 40a of splitter gear 38 or main box gear 40, respectively. The range gear shaft 28 is supported by a ball bearing assembly 154 and the main box gear 44 is separated from the ball bearing assembly 154 by a spacer 760 which transmits thrust loads to the inner bearing race from the clutch hub 754.

The shaft and bearing architectures for the twin countershaft splitter type transmissions provides robust gearbox alignment and front split gearing support in compliance. This architecture provides robustness against engine flywheel pilot bearing misalignment with respect to the transmission gearbox centerline. This architecture also provides robust torque/power-sharing for twin countershaft splitter transmissions, plus is beneficial for power takeoff drives and potential ancillary hybridization.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transmission, comprising:
   an input shaft;
   a two-piece extension shaft having a primary extension shaft portion and a separate secondary extension shaft portion drivingly connected to the primary extension shaft portion, the primary extension shaft portion being drivingly connected to the input shaft;
   a first splitter gear and a second splitter gear selectively couple-able to the primary extension shaft portion and a third splitter gear supported on a thrust race rotatably supported on the secondary extension shaft portion;

a main shaft rotatably supported on the secondary extension shaft portion and including a plurality of main box gears selectively couple-able to the main shaft;
a range shaft drivingly connected to the main shaft, the range shaft providing input to a planetary gear assembly;
at least one countershaft having a plurality of gears disposed thereon and meshingly engaged with respective ones of the plurality of splitter gears and the plurality of main box gears, and
a power take-off drive gear connected for rotation with the primary extension shaft portion.

2. A transmission, comprising:
an input shaft;
a two-piece extension shaft having a primary extension shaft portion and a separate secondary extension shaft portion drivingly connected to the primary extension shaft portion, the primary extension shaft portion being drivingly connected to the input shaft;
a first splitter gear and a second splitter gear selectively couple-able to the primary extension shaft portion and a third splitter gear supported on a thrust race rotatably supported on the secondary extension shaft portion;
a main shaft rotatably supported on the secondary extension shaft portion and including a plurality of main box gears selectively couple-able to the main shaft;
a range shaft drivingly connected to the main shaft, the range shaft providing input to a planetary gear assembly;
at least one countershaft having a plurality of gears disposed thereon and meshingly engaged with respective ones of the plurality of splitter gears and the plurality of main box gears,
further comprising a first thrust bearing disposed between the primary extension shaft portion and the thrust race and a second thrust bearing disposed between the thrust race and the main shaft.

3. The transmission according to claim 2, further comprising a thrust washer disposed between the first thrust bearing and an end of the primary extension shaft portion.

4. The transmission according to claim 3, further comprising a spring member disposed between the thrust washer and the primary extension shaft portion.

5. The transmission according to claim 4, wherein the thrust race is supported on the secondary extension shaft portion by a needle bearing.

6. The transmission according to claim 2, wherein the first thrust bearing is disposed directly against the thrust race.

7. The transmission according to claim 2, wherein the second thrust bearing is disposed directly against the thrust race.

8. The transmission according to claim 2, further comprising a bearing race disposed between second thrust bearing and the main shaft.

9. The transmission according to claim 8, wherein the bearing race includes a tapered surface that is disposed against a washer that is disposed against an end of the main shaft.

10. The transmission according to claim 8, wherein the bearing race includes a tapered surface that is disposed against a spherical washer.

11. The transmission according to claim 10, further comprising a flat washer disposed between the spherical washer and an end of the main shaft and a spring member disposed between the flat washer and the main shaft.

12. The transmission according to claim 2, further comprising a thrust washer disposed between the thrust race and the second thrust bearing.

13. The transmission according to claim 2, further comprising a thrust washer disposed between the first thrust bearing and the thrust race.

14. The transmission according to claim 2, wherein the plurality of main box gears include three main box gears, and wherein the planetary gear assembly provides two gear speeds.

15. The transmission according to claim 2, further comprising a clutch hub rotatably connecting the main shaft to the range shaft.

16. The transmission according to claim 15, wherein the clutch hub includes internal splines engaging external splines on the main shaft and external splines on the range shaft.

17. The transmission according to claim 2, wherein the main shaft includes exterior splines that are drivingly connected to interior splines of the range shaft.

18. A transmission, comprising:
an input shaft;
a single piece extension shaft being drivingly connected to the input shaft;
a first splitter gear and a second splitter gear selectively couple-able to the extension shaft and a third splitter gear supported on a thrust race rotatably supported on the extension shaft;
a main shaft rotatably supported on the extension shaft and including a plurality of main box gears selectively couple-able to the main shaft;
a range shaft drivingly connected to the main shaft, the range shaft providing input to a planetary gear assembly;
at least one countershaft having a plurality of gears disposed thereon and meshingly engaged with respective ones of the plurality of splitter gears and the plurality of main box gears,
further comprising a first thrust bearing disposed between the extension shaft and the thrust race and a second thrust bearing disposed between the thrust race and the main shaft.

19. The transmission according to claim 18, further comprising a thrust washer disposed between the first thrust bearing and an end of the extension shaft.

20. The transmission according to claim 19, further comprising a spring member disposed between the thrust washer and the extension shaft.

21. The transmission according to claim 20, wherein the thrust race is supported on the extension shaft by a needle bearing.

* * * * *